(12) United States Patent
Alarcon et al.

(10) Patent No.: US 12,372,191 B2
(45) Date of Patent: Jul. 29, 2025

(54) INSULATION PRODUCTS AND METHODS AND MACHINES FOR MAKING INSULATION PRODUCTS

(71) Applicant: TemperPack Technologies, Inc., Richmond, VA (US)

(72) Inventors: Samuel Alarcon, Richmond, VA (US); Scott Karpen, Richmond, VA (US); Alexander Norman Dimen, Ricmond, VA (US); Stefan Marchetti, Richmond, VA (US); John Schuhle, Richmond, VA (US); James McGoff, Richmond, VA (US); Charles-Alexandre Archambault Vincent, Richmond, VA (US); Justin Turner-Gonzalez, Richmond, VA (US)

(73) Assignee: TemperPack Technologies, Inc., Richmond, VA (US)

( * ) Notice: Subject to any disclaimer, the term of this patent is extended or adjusted under 35 U.S.C. 154(b) by 0 days.

(21) Appl. No.: 18/607,445

(22) Filed: Mar. 16, 2024

(65) Prior Publication Data
US 2024/0309984 A1    Sep. 19, 2024

Related U.S. Application Data

(60) Provisional application No. 63/491,045, filed on Mar. 17, 2023.

(51) Int. Cl.
*B32B 27/10*    (2006.01)
*B31D 5/00*    (2017.01)
(Continued)

(52) U.S. Cl.
CPC ............. *F16L 59/07* (2013.01); *B31D 5/006* (2013.01); *B32B 27/10* (2013.01); *B32B 29/005* (2013.01);
(Continued)

(58) Field of Classification Search
CPC ........ F16L 59/07; F16L 59/029; B32B 27/10; B32B 29/005; B32B 29/08;
(Continued)

(56) References Cited

U.S. PATENT DOCUMENTS 4,286,006 A * 8/1981 Boelter .................. B32B 27/32
428/913
5,681,641 A * 10/1997 Grigsby ................ B31F 1/0012
428/184
(Continued)

FOREIGN PATENT DOCUMENTS

WO    2023009802    2/2023

OTHER PUBLICATIONS

International Search Report mailed Jul. 12, 2024 for Application No. PCT/US2024/020328.

*Primary Examiner* — Maria V Ewald
*Assistant Examiner* — Daniel P Dillon
(74) *Attorney, Agent, or Firm* — TROUTMAN PEPPER LOCKE LLP; Christopher Forstner; Scott A. Bergeson

(57) ABSTRACT

An insulation or cushioning product including a first panel that may include a second layer having a second width and including one or more extension portions. The first panel may include a core layer having a first width less than the second width and including a first continuous paper sheet formed into a first plurality of flexible loops disposed on and attached to the second layer, and defining a first plurality of air channels that extend in a direction that is substantially perpendicular with a length direction of the first panel. The second layer may cover at least a portion of one or more edges of the core layer and covers at least a portion of a top or bottom surface of the core panel. The one or more extension portions may have an extension width greater than or equal to a thickness of the core layer.

17 Claims, 26 Drawing Sheets

(51) Int. Cl.
*B32B 29/00* (2006.01)
*B32B 29/08* (2006.01)
*B32B 37/00* (2006.01)
*B32B 37/18* (2006.01)
*F16L 59/02* (2006.01)
*F16L 59/07* (2006.01)

(52) U.S. Cl.
CPC .......... *B32B 29/08* (2013.01); *B32B 37/0046* (2013.01); *B32B 37/18* (2013.01); *F16L 59/029* (2013.01); *B31D 2205/0047* (2013.01); *B32B 2307/304* (2013.01); *B32B 2307/7376* (2023.05); *B32B 2553/00* (2013.01)

(58) Field of Classification Search
CPC ................ B32B 37/0046; B32B 37/18; B32B 2307/304; B32B 2307/7376; B32B 2553/00

USPC ........................................................ 428/186
See application file for complete search history.

(56) References Cited

U.S. PATENT DOCUMENTS

| | | |
|---|---|---|
| 6,083,580 A * | 7/2000 | Finestone ............... B32B 29/08 428/184 |
| 6,502,849 B1 * | 1/2003 | Kamiakito ............... A63C 5/07 280/610 |
| 10,800,596 B1 | 10/2020 | Vincent et al. |
| 2011/0045957 A1 | 2/2011 | Mehta |
| 2011/0195231 A1 * | 8/2011 | Lai ............................ B32B 7/05 428/186 |
| 2020/0283957 A1 | 9/2020 | Flynn et al. |

* cited by examiner

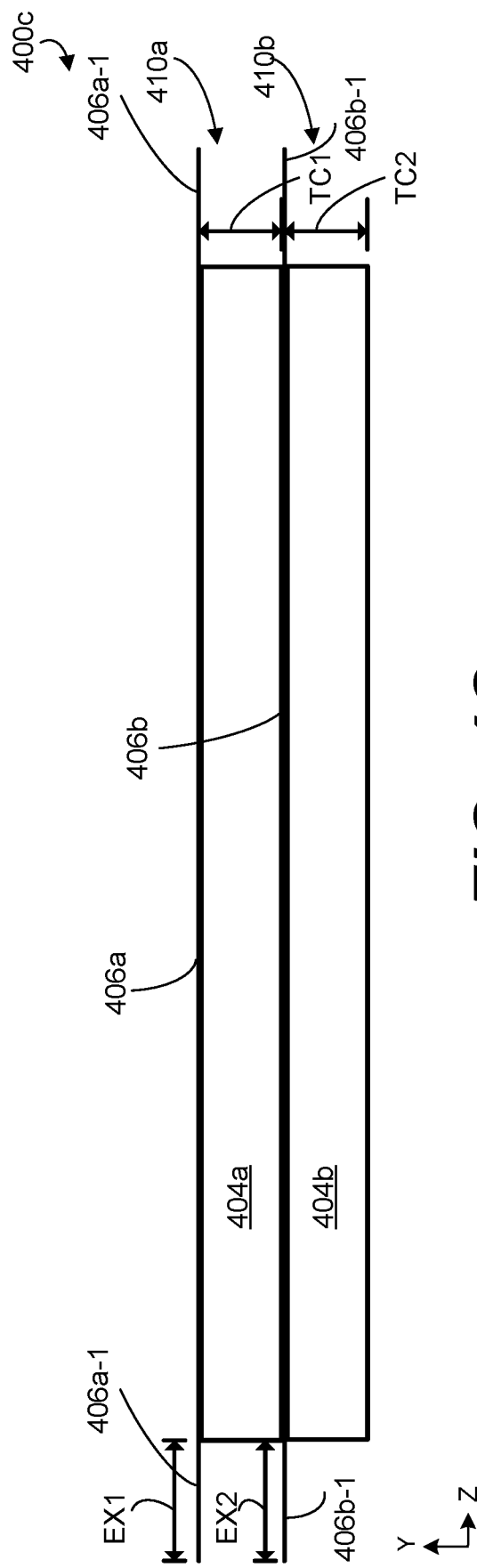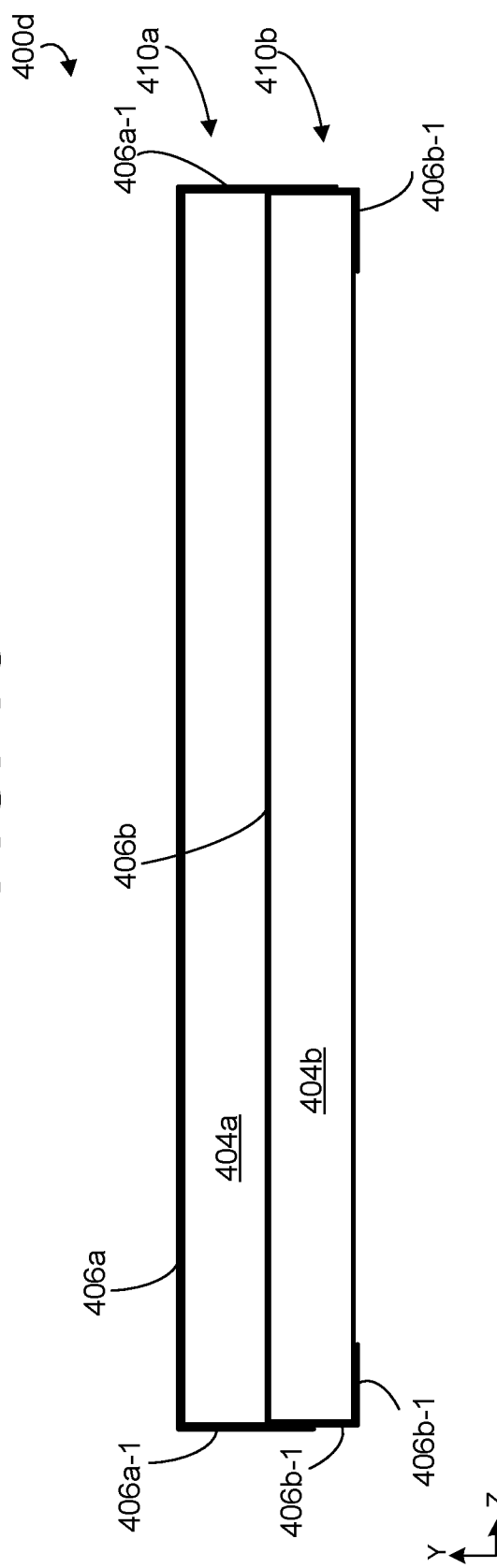

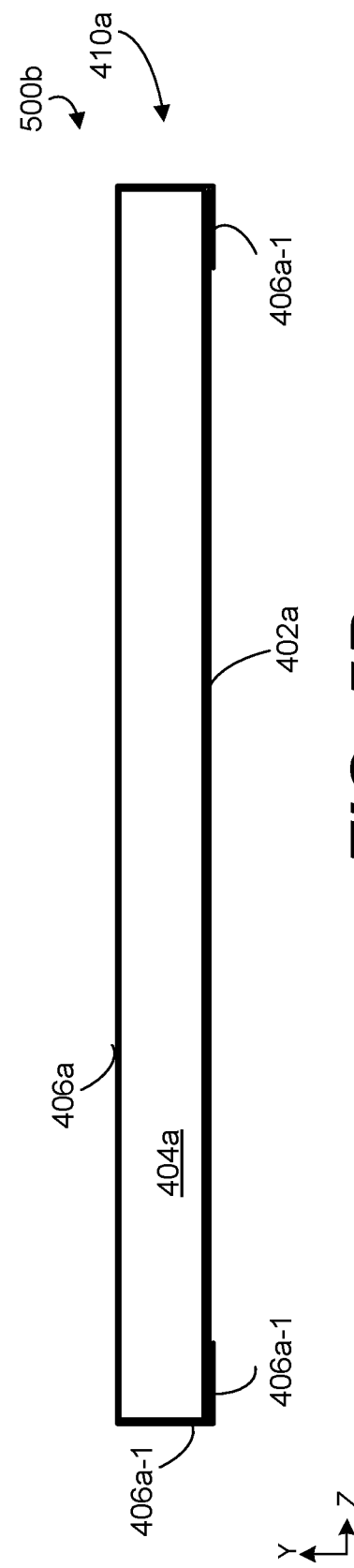
FIG. 5A
FIG. 5B

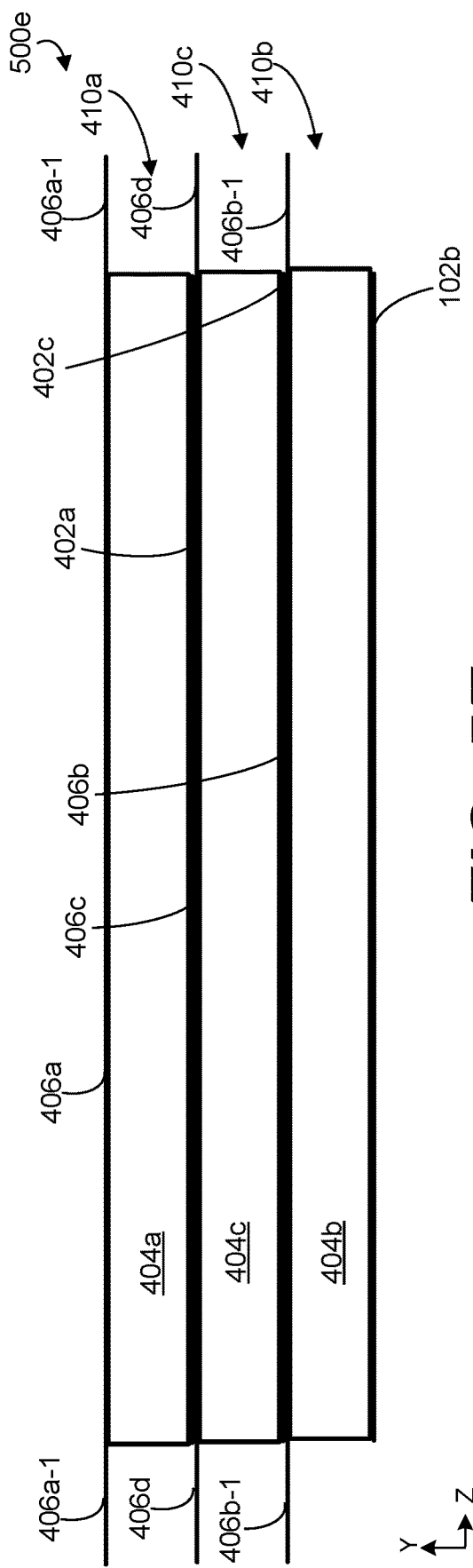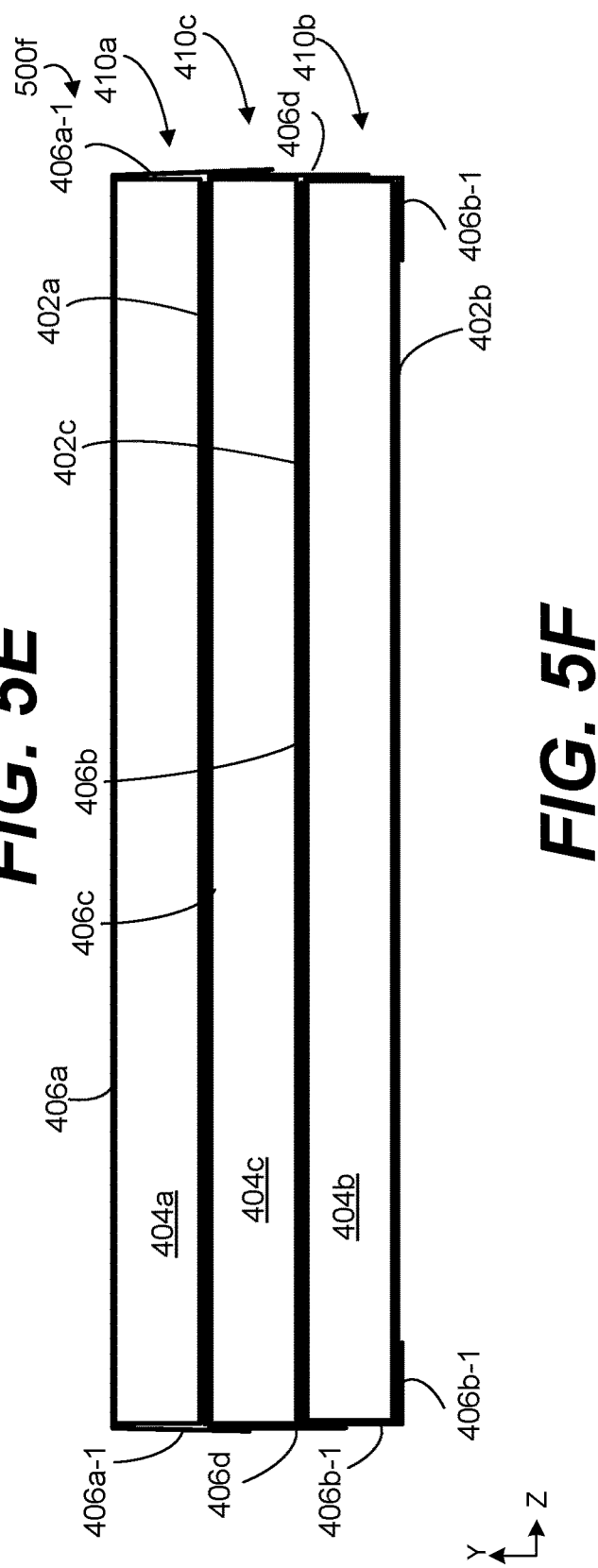

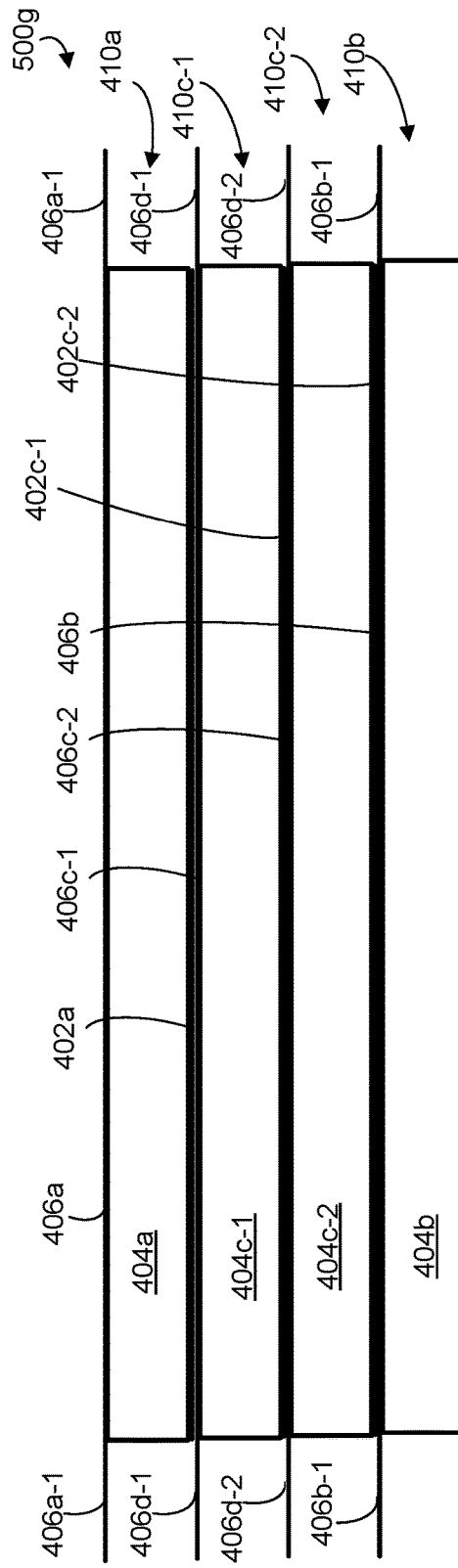
FIG. 5G
FIG. 5H

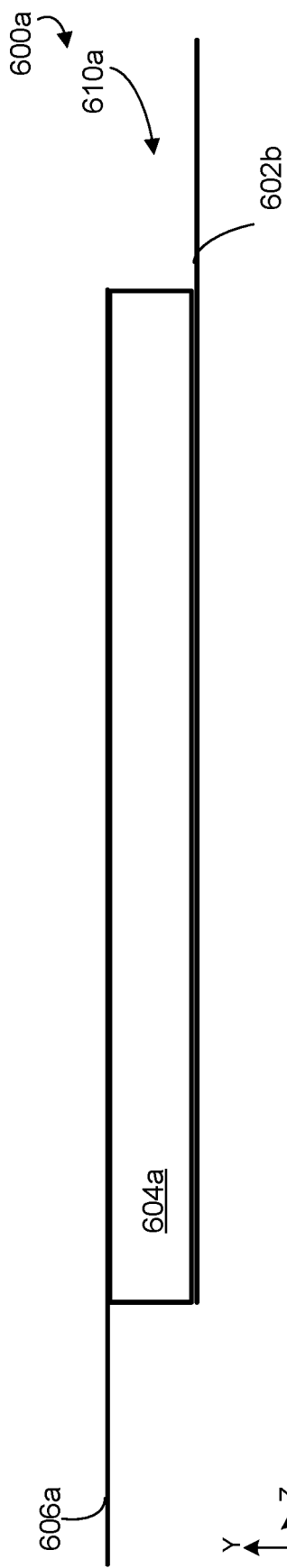
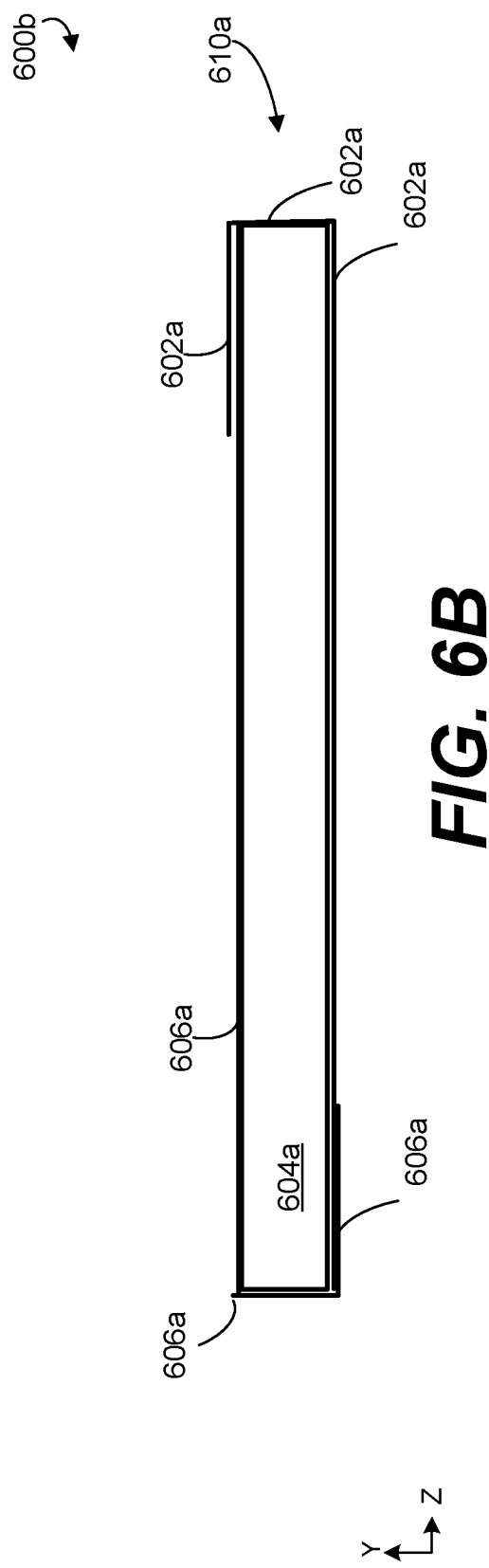

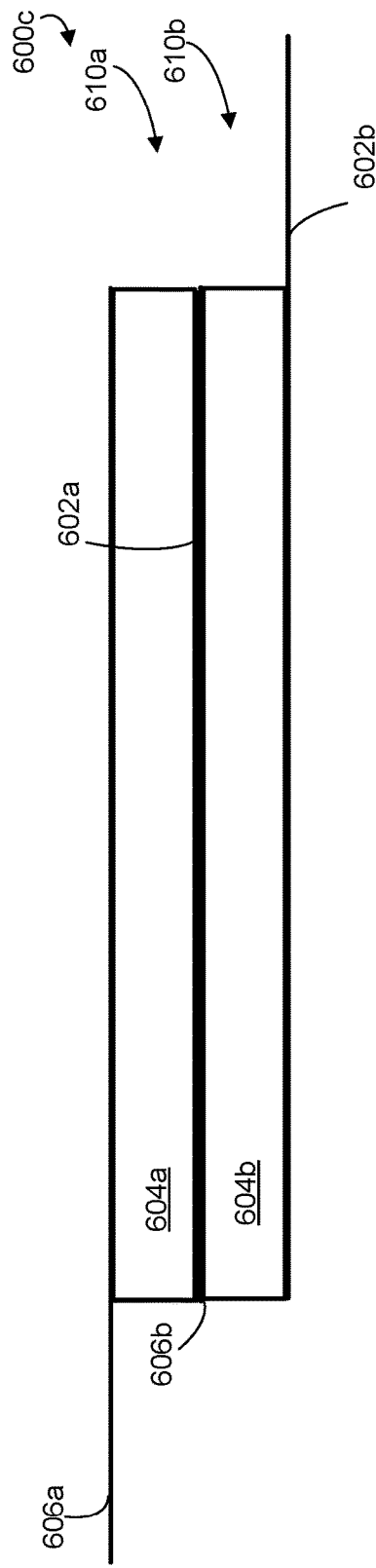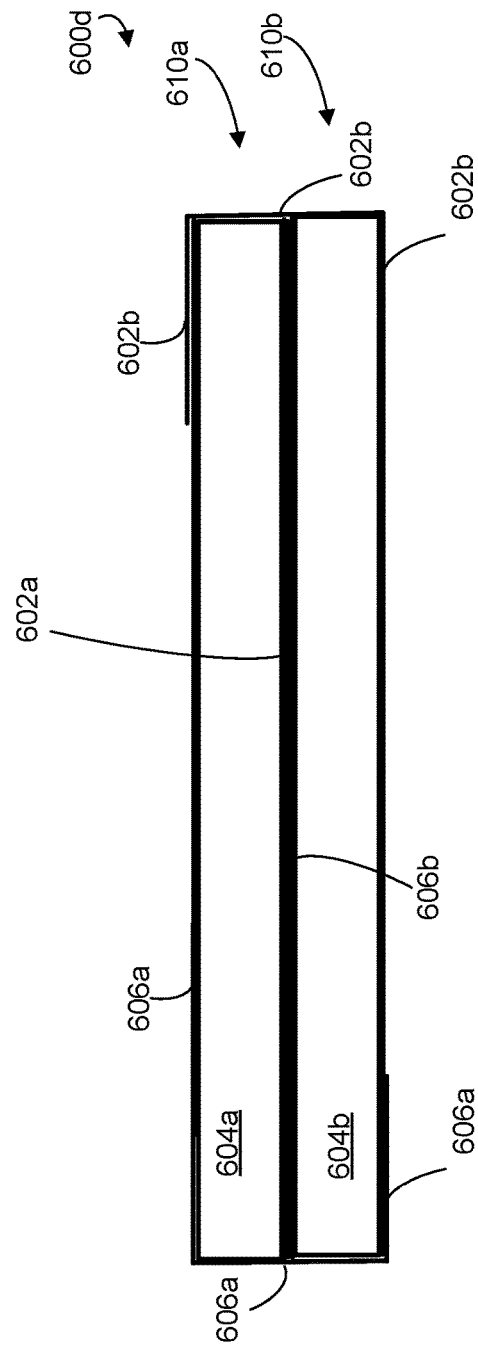
FIG. 6C
FIG. 6D

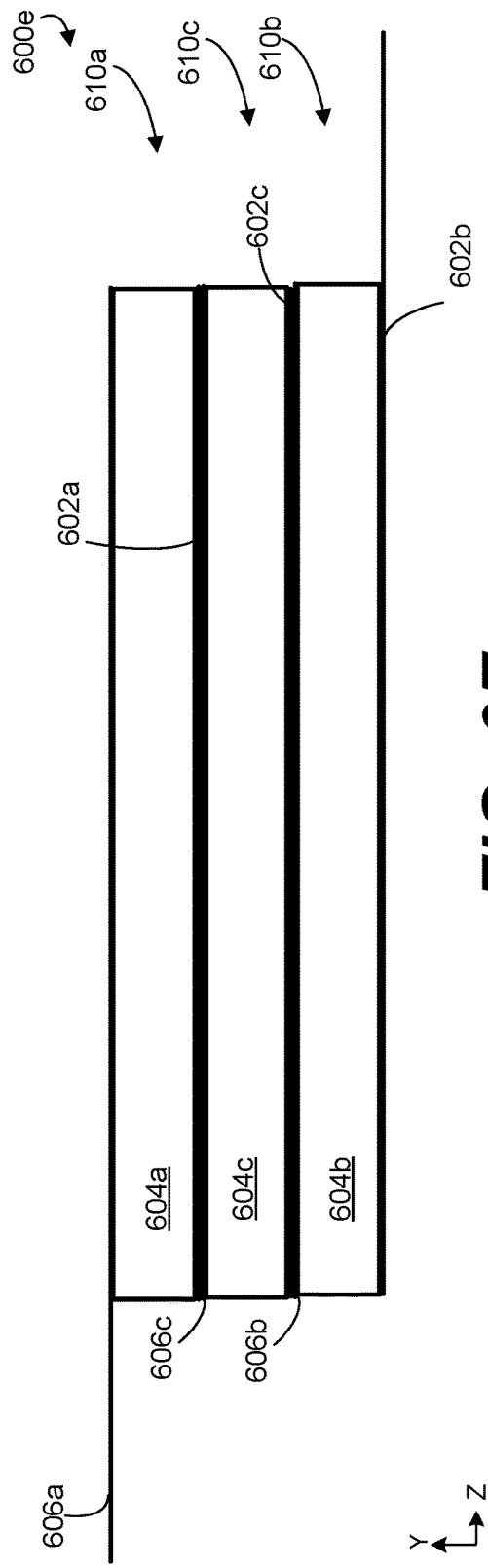
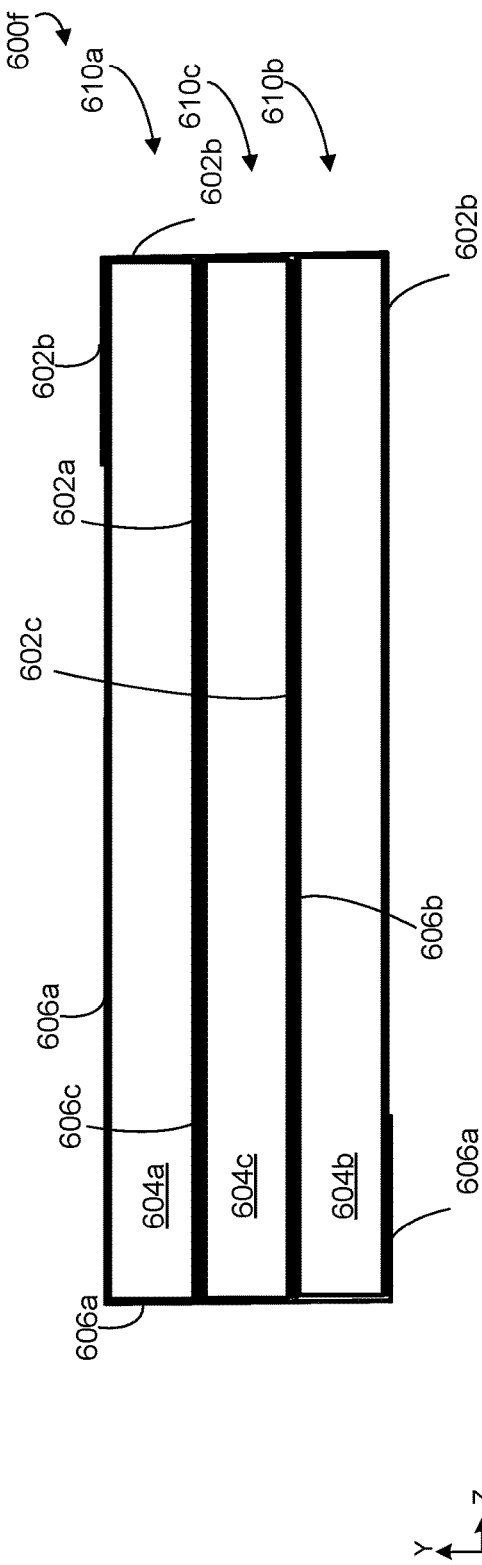
FIG. 6E
FIG. 6F

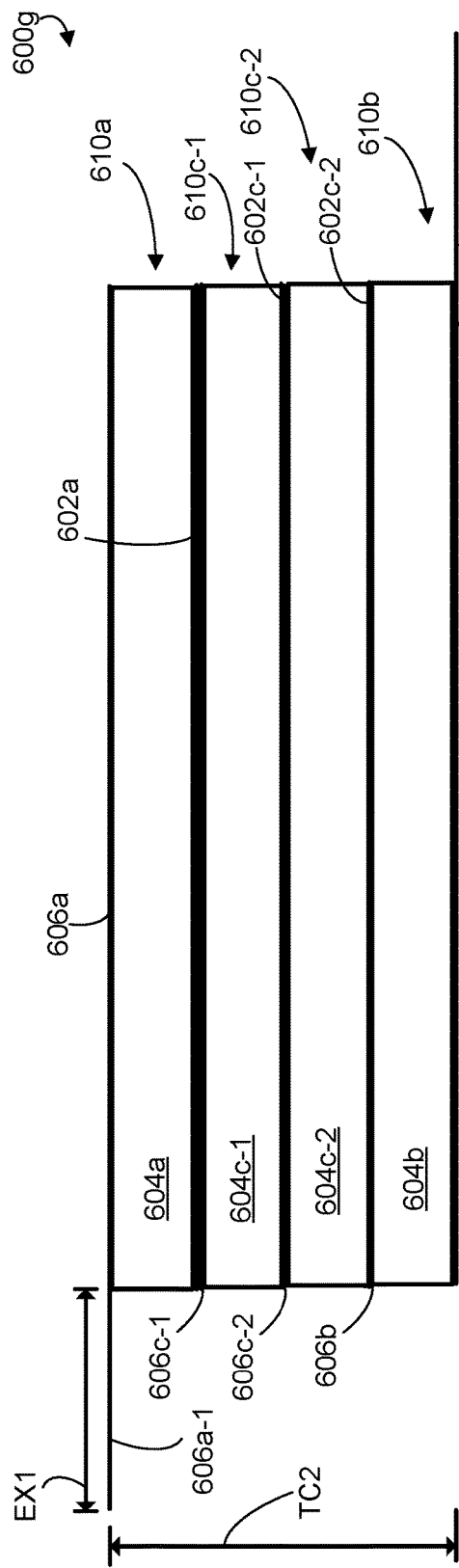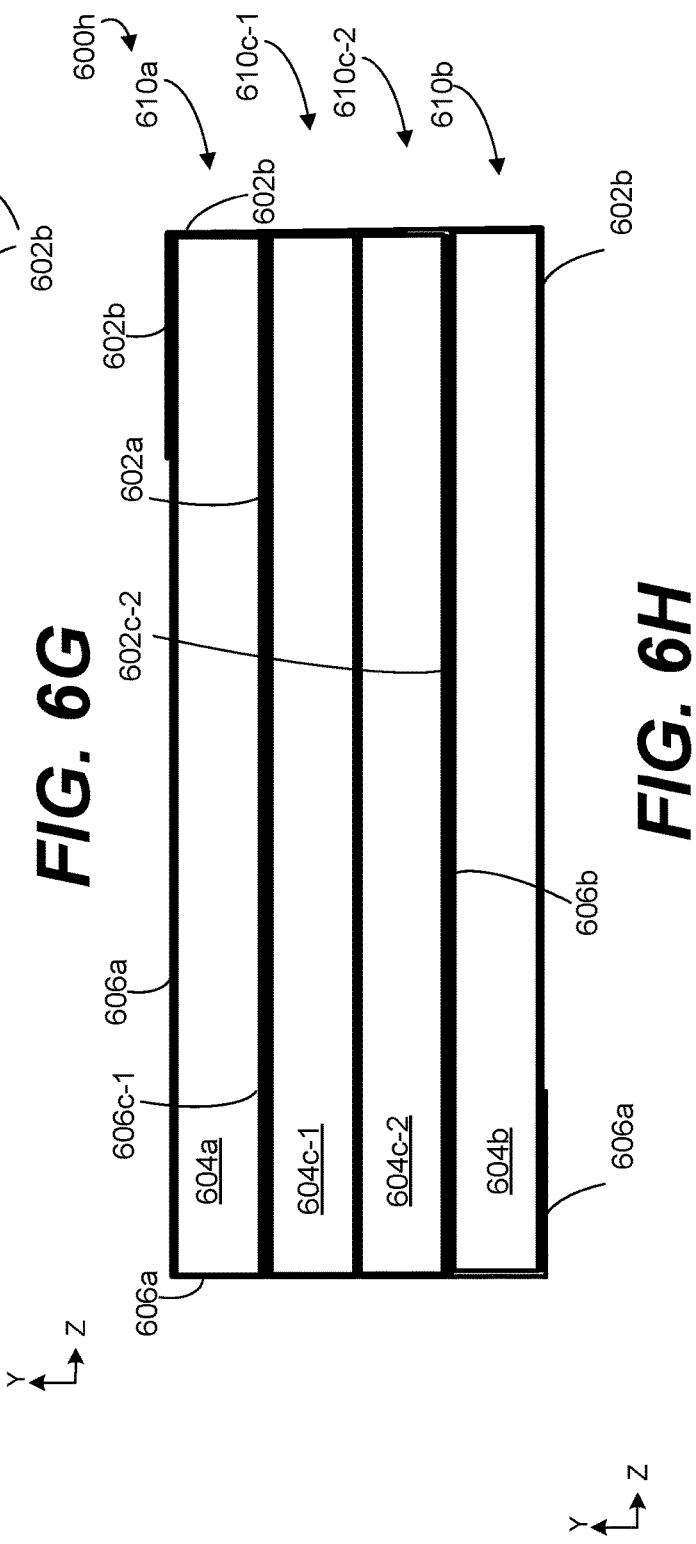
FIG. 6G
FIG. 6H

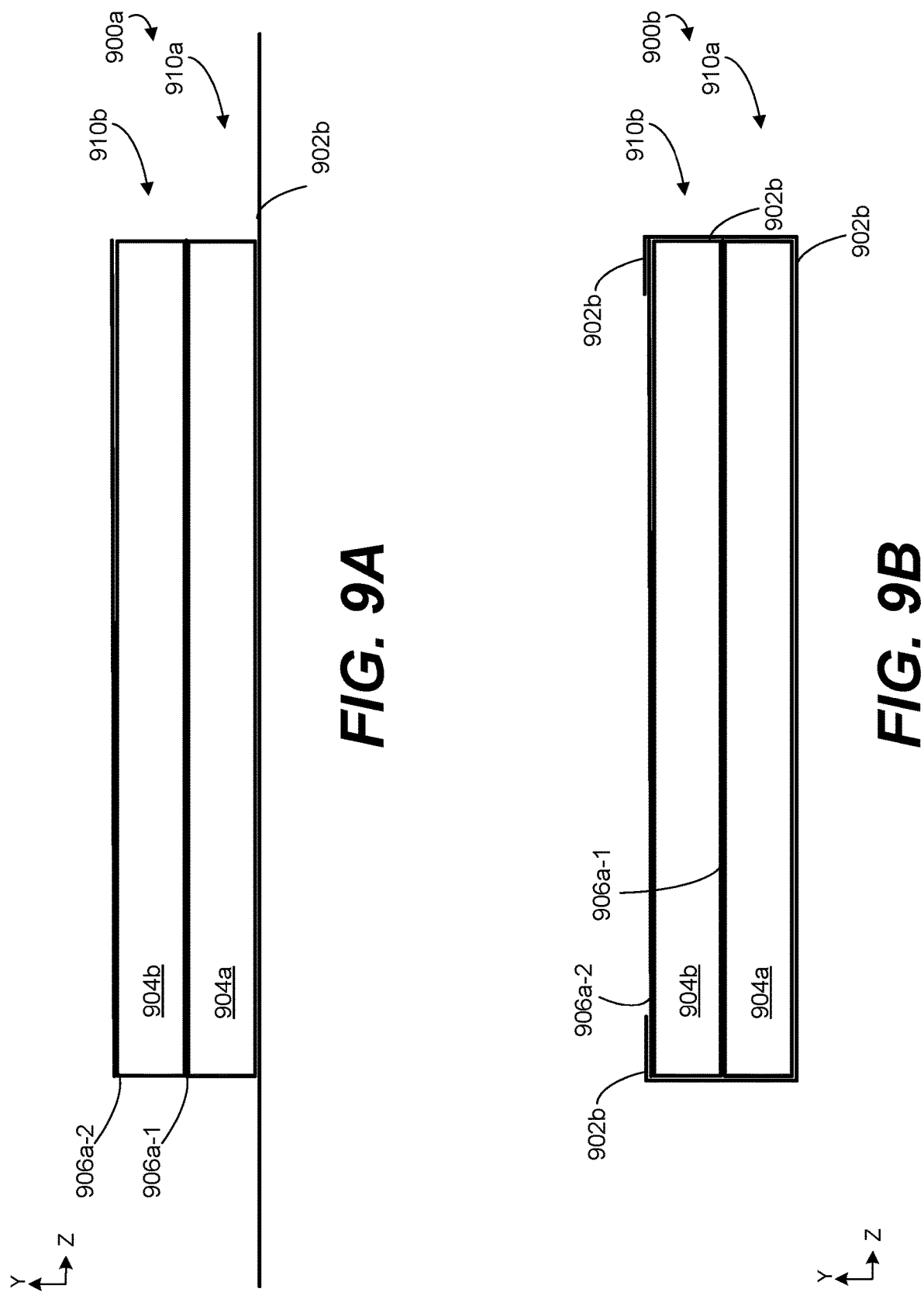

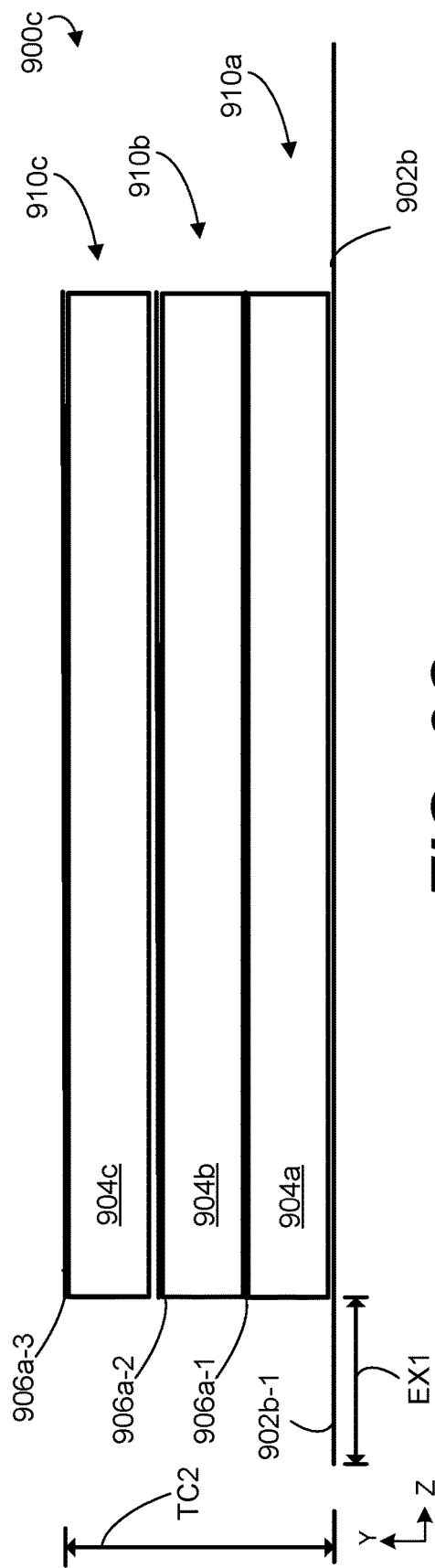
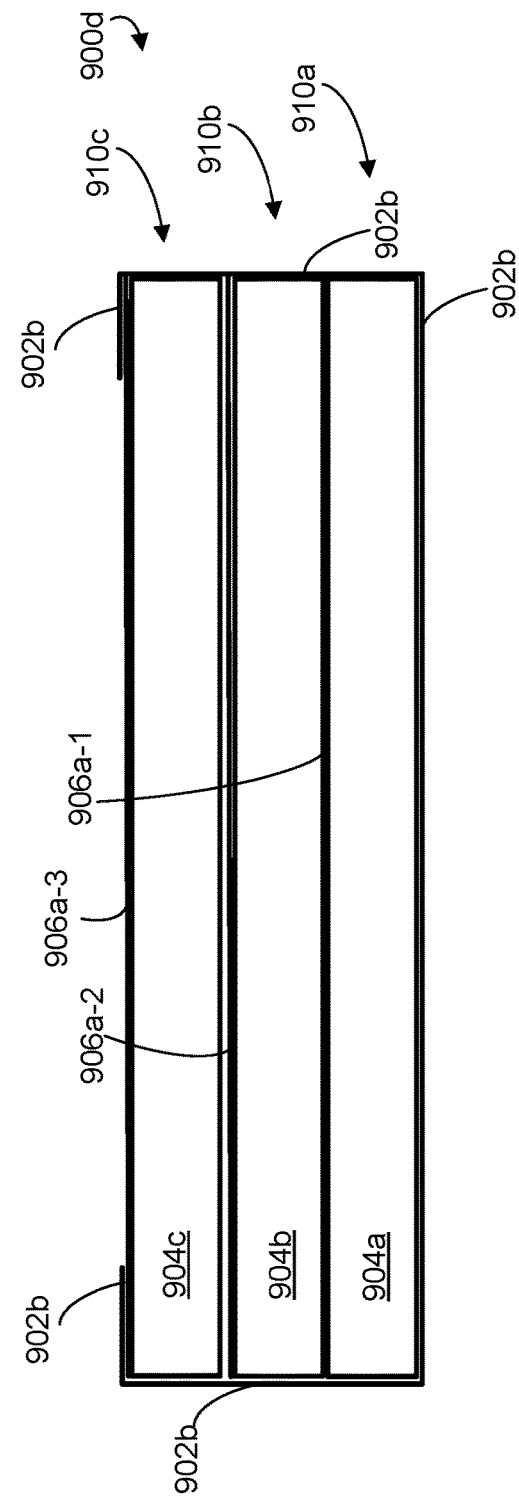

INSULATION PRODUCTS AND METHODS AND MACHINES FOR MAKING INSULATION PRODUCTS

CROSS-REFERENCE TO RELATED APPLICATION

This application claims priority under 35 U.S.C. § 119 to U.S. Provisional Patent Application No. 63/491,045, filed Mar. 17, 2023, entitled "INSULATION PRODUCTS AND METHODS FOR MAKING INSULATION PRODUCTS," the entire contents of which are fully incorporated herein by reference for all purposes.

FIELD

The presently disclosed subject matter generally relates to insulation products for packaging and shipping and methods and machines for making insulation products.

BACKGROUND

Insulation materials have long been used in a variety of applications and are being increasingly used in insulated shipping containers to provide desired or required thermal environments when shipping goods. For example, an insulated shipping container transporting perishable goods (e.g., refrigerated meals or pharmaceuticals) may increase the longevity of the goods and, in turn, expand the shipping area of the customer base. While some insulated shipping containers are designed for long term use, others are designed for a more limited lifespan in favor of lower material and manufacturing costs. The ever-increasing volume of non-reusable shipping containers results in higher levels of waste, most of which is non-recyclable or non-compostable at least in part because the insulation materials are often non-recyclable or non-compostable. Environmentally conscious retailers and consumers are faced with limited environmentally friendly and responsible options for disposing insulation materials following use.

Accordingly, there is a need for an insulation product and/or protective product for shipping and/or packaging that is recyclable or compostable, provides insulation and cushioning properties, and is lightweight and effective. There is also a need for methods that allow customers to make such insulation product on demand and to optimally design custom insulation products for delivery destinations and weather forecasts. Embodiments of the present disclosure are directed to these and other considerations.

SUMMARY

Briefly described, embodiments of the presently disclosed subject matter relate to insulation products and one or more methods for making an insulation product configured to insulate and/or cushion items for transport, whether such transport needs include shipping long distances, local delivery, or self-transport in a vehicle.

In an aspect, an insulation product may include a first panel that may include a second layer having a second width and including one or more extension portions. The first panel may include a core layer having a first width less than the second width and including a first continuous paper sheet formed into a first plurality of flexible loops disposed on and attached to the second layer and defining a first plurality of air channels that extend in a direction that is substantially perpendicular with a length direction of the first panel. The second layer may cover at least a portion of one or more edges of the core layer and cover at least a portion of a top or bottom surface of the core layer. The one or more extension portions may have an extension width greater than or equal to a thickness of the core layer.

In an aspect, a method of forming an insulation product may include providing a first insulation panel including a first layer and a first core layer with the first layer being wider than the first core layer in a Z-direction. The first layer may include one or more extension portions having an extension width equal to or greater than a thickness of the first core layer. The method may also include directing the first layer to fold (e.g., down or up) along one or more edges of the core layer. The method may also include directing the first layer to fold over a portion of a top surface of the first core layer. The method may also include applying heat, pressure, an adhesive, or a combination thereof, to at least the first layer disposed on the top surface of the first core layer or to the top surface of the core layer to bond the first layer to a portion of the core layer or another layer disposed on the core layer and form the insulation product.

In an aspect, a method of forming an insulation product may include providing a first insulation panel including a first layer, a first core layer, and a second layer with the second layer being wider than the first layer in a Z-direction, the second layer comprising one or more extension portions having a first extension width that is equal to or greater than a thickness of the first core layer. The method also includes providing a second insulation panel including a third layer, a second core layer, and fourth layer with the fourth layer being wider than the third layer in the Z-direction, the fourth layer comprising one or more extension portions having a second extension width that is equal to or greater than a thickness of the second core layer. The method may include stacking the first and second insulation panels and aligning the first and second insulation panels. The method may include directing the second and fourth layers to fold alongside surfaces of the first and second insulation panels such that the fourth layer at least partially overlaps the second layer. The method may include directing the second layer to fold over a portion of a top surface of the first insulation panel. The method may include applying heat, pressure, an adhesive, or combination thereof, to the second and fourth layers to form the insulation product by at least partially bonding the second and fourth layers.

In an aspect, a machine may include a stacking assembly configured to create a stacked product from two or more products. The stacking assembly may include an alignment stop configured to prevent the one or more products from being transported for a predetermined about of time. The stacking assembly may also include a stacking mechanism configured to stack the one or more products for the predetermined amount of time such that at least one product may be stacked with the one or more products to create the stacked product. The machine may include a sealing assembly. The sealing assembly may include one or more second conveyor belts and one or more third conveyor belts positioned below the one or more second conveyor belts, and one or more heaters configured to heat and seal an outer layer along at least a portion of a top of the stacked product.

The foregoing exemplifies certain aspects of the presently disclosed subject matter and is not intended to be reflective of the full scope of the presently disclosed subject matter. Additional features and advantages of the presently disclosed subject matter are set forth in the following exemplary description, may be apparent from the description, or may be learned by practicing the presently disclosed subject matter.

BRIEF DESCRIPTION OF THE DRAWINGS

FIGS. 4A-4H are front views of the insulation product without a second layer per insulation panel prior to and after being sealed, according to exemplary embodiments.

FIGS. 5A-5H are front views of the insulation product with two laminating layers for each insulation panel prior to and after being sealed, according to exemplary embodiments.

FIGS. 6A-6H are front views of the insulation product prior to and after being sealed, according to exemplary embodiments.

FIGS. 9A-9D are front views of the insulation product prior to and after being sealed, according to exemplary embodiments.

DETAILED DESCRIPTION

Figure 1A:
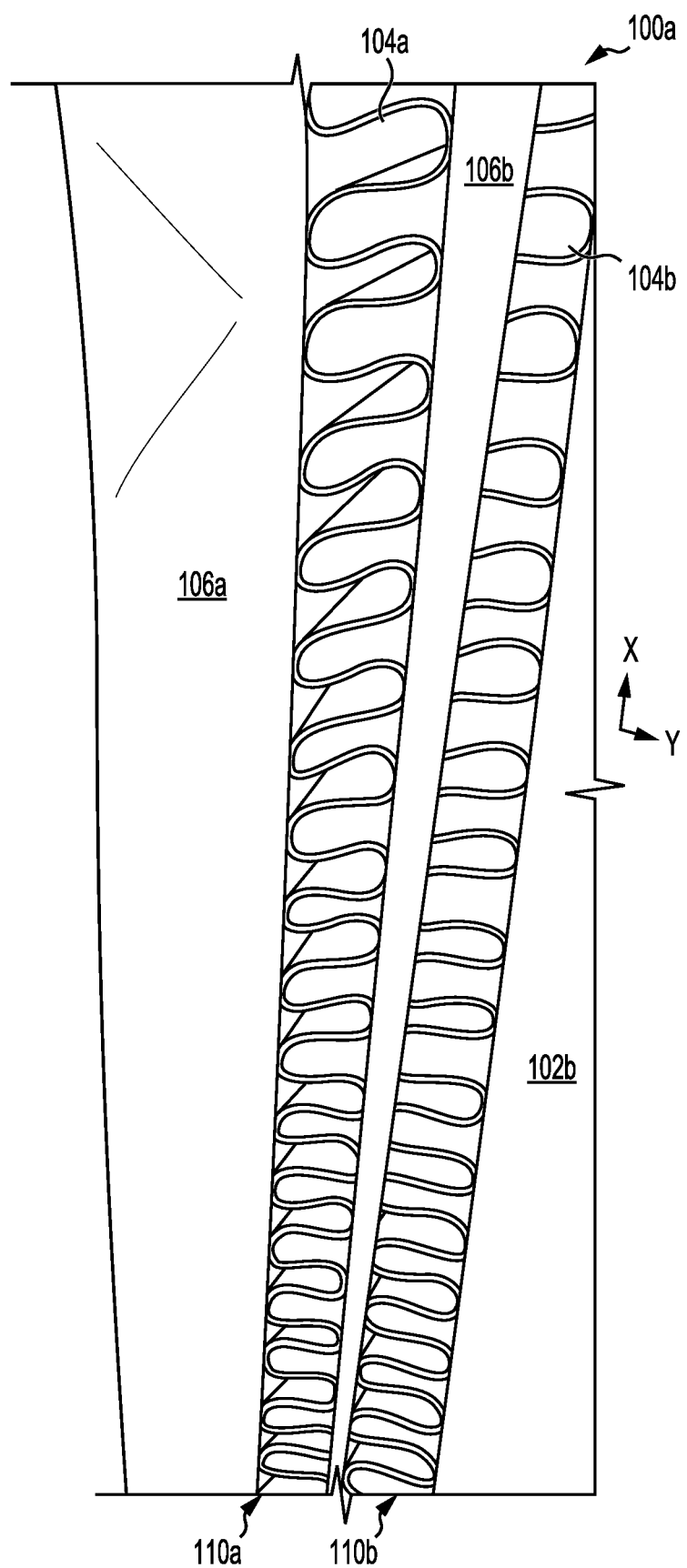
FIGS. 1A and 1B are perspective views of an insulation product, according to exemplary embodiments.

To facilitate an understanding of the principles and features of the disclosed technology, illustrative embodiments are explained below. The components described hereinafter as making up various elements of the disclosed technology are intended to be illustrative and not restrictive.

Insulation products including a core layer or continuous paper sheet including a plurality of flexible loops covered by a first and/or second layer (e.g., paper) are described in U.S. Provisional Patent Application No. 63/227,727, filed Jul. 30, 2021, entitled "RECYCLABLE INSULATION MATERIAL AND METHODS AND MACHINES FOR MAKING"; U.S.

Provisional Patent Application No. 63/284,779, filed Dec. 1, 2021, entitled "INSULATION MATERIAL AND METHODS AND MACHINES FOR MAKING INSULATION MATERIALS," U.S. Provisional Patent Application No. 63/349,616, filed Jun. 7, 2022, entitled "INSULATION MATERIAL AND METHODS AND MACHINES FOR MAKING INSULATION MATERIALS," U.S. Patent Application No. 17,816,100, entitled "INSULATION PRODUCTS, METHODS, AND MACHINES FOR MAK- ING INSULATION PRODUCTS," the entire contents of all of which are fully incorporated herein by reference for all purposes.

Embodiments of the disclosed technology include insulation products capable of being recycled curbside or compostable, flexible for providing insulation and cushioning to items in a shipping container (such as grocery items), lightweight, and constructed in a manner that allows for on-demand manufacture (such as on location at retailer shipping locations). Such insulation products not only offer advantageous insulation and cushioning properties, but also may avoid certain shipping costs and constraints associated with shipping pre-manufactured insulation products with larger volumes (due to the manufactured state) and needs to ensure that such products maintain insulation properties while in transit to retailer shipping locations. Additionally, the disclosed methods for manufacturing insulation products provide users with flexibility in the sizing, dimensions, and insulation property qualities needed for individual retailer needs (such as individual product shipping requirements), such that insulation products can be customized at a retailer shipping location, leading to less waste, higher cost efficiency, and time savings. Referring now to the figures, in which like reference numerals represent like parts, various embodiments of the disclosure will be disclosed in detail.

Figure 1B:
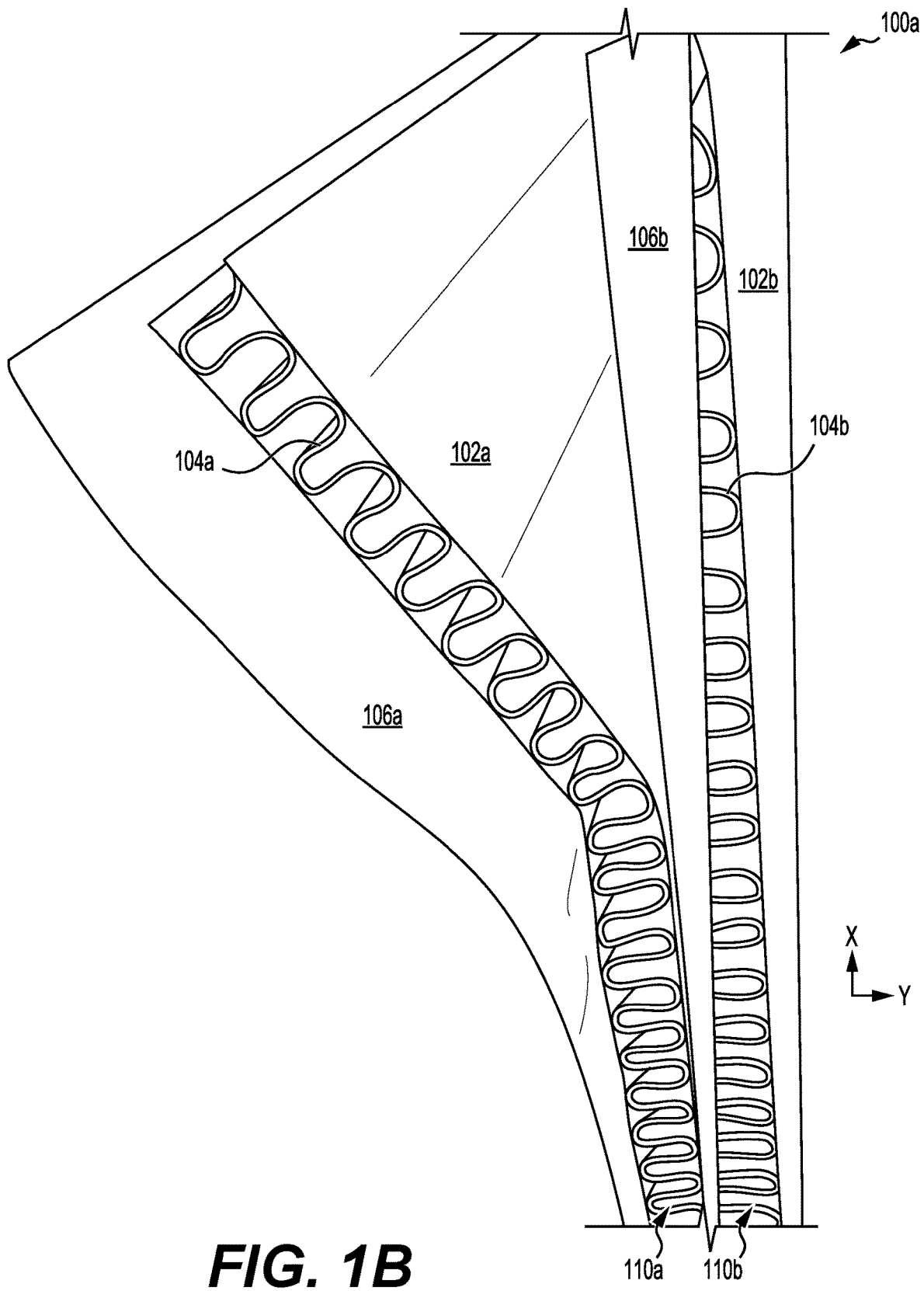

FIGS. 1A and 1B are perspective views of an insulation product 100a. FIG. 1A shows two insulation panels 110a, 110b attached to one another, whereas FIG. 1B shows the two insulation panels 110a, 110b separated at one end to illustrate more detail and show the layers of each panel 110a, 110b. Insulation product 100a may include first insulation panel 110b that may include a first layer 102b having a first width (in the Z-direction), a second layer 106b having a second width (in the Z-direction) that is greater than the first width, such as about 1% to 50% wider than the first width. Put another way, the second layer 106b has additional extension material that extends past a side surface of the first panel 110b at least at one or opposite ends. The first panel 110b may also include a first continuous paper sheet 104b (or core layer) formed into a first plurality of flexible loops disposed on and attached to the first layer 102b, attached to the second layer 106b, and defining a first plurality of air channels that extend in a direction (Z-direction—see FIGS. 4A and 4B) that is substantially perpendicular with a length direction (X-direction) of the first panel 110b. Insulation product 100a may include a second insulation panel 110a that may include a third layer 102a having a third width (in the Z-direction), a fourth layer 106a having a fourth width (in the Z-direction) that is greater than the third width, such as about 1% to 50% wider than the width. Put another way, the fourth layer 106a has additional extension material that extends past a side surface of the second panel 110a at least at one or opposite ends. The second panel 110a may also include a first continuous paper sheet 104a formed into a second plurality of flexible loops disposed on and attached to the third layer 102a, attached to the fourth layer 106a, and defining a first plurality of air channels that extend in a direction (Z-direction-see FIGS. 4A and 4B) that is substantially perpendicular with a length direction (X-direction) of the second panel 110a. In some embodiments, the first paper sheet 104b may be formed into a first plurality of flexible loops comprising a first flexible loop, a second flexible loop, and a third flexible loop with the first and third flexible loops proximate the first layer and the second flexible loop disposed between the first and third flexible loops and proximate the second layer. The second paper sheet 104a may be similarly formed. The second layer 106b may cover at least a portion of a side surface of the first panel 110b aligned with the length direction (e.g., X-direction) of the first panel 110b and cover at least a portion of a planar surface (e.g., bottom, or top surface) of the first panel 110b. The fourth layer 106a may cover at least a portion of a side surface of the second panel 110a aligned with the length direction (e.g., X-direction) of the second panel 110a and cover a portion of the second layer 106b disposed on the side surface of the first panel 110b. In some embodiments, the insulation product does not include the third layer 102a and the first continuous paper sheet 104b and the second continuous paper sheet 104a may each directly contact the second layer 106b. In some embodiments, the first layer 102b, the second layer 106b, the third layer 102a, the fourth layer 106a, the first paper sheet 104b, and/or the second paper sheet 104a may include kraft paper, machine glazed (MG) paper, smooth finished (SF) paper, machined finished (MF) paper, glassines, one or more polymeric films, paper-based product, supercalendered kraft (SCK) paper, newsprint paper, coated paper, and/or coated kraft paper. Although a continuous paper sheet or core layer 104b is described throughout this application, in some embodiments, starch or any other material suitable for insulation or cushioning may be used for the core layers described herein.

Figure 2:
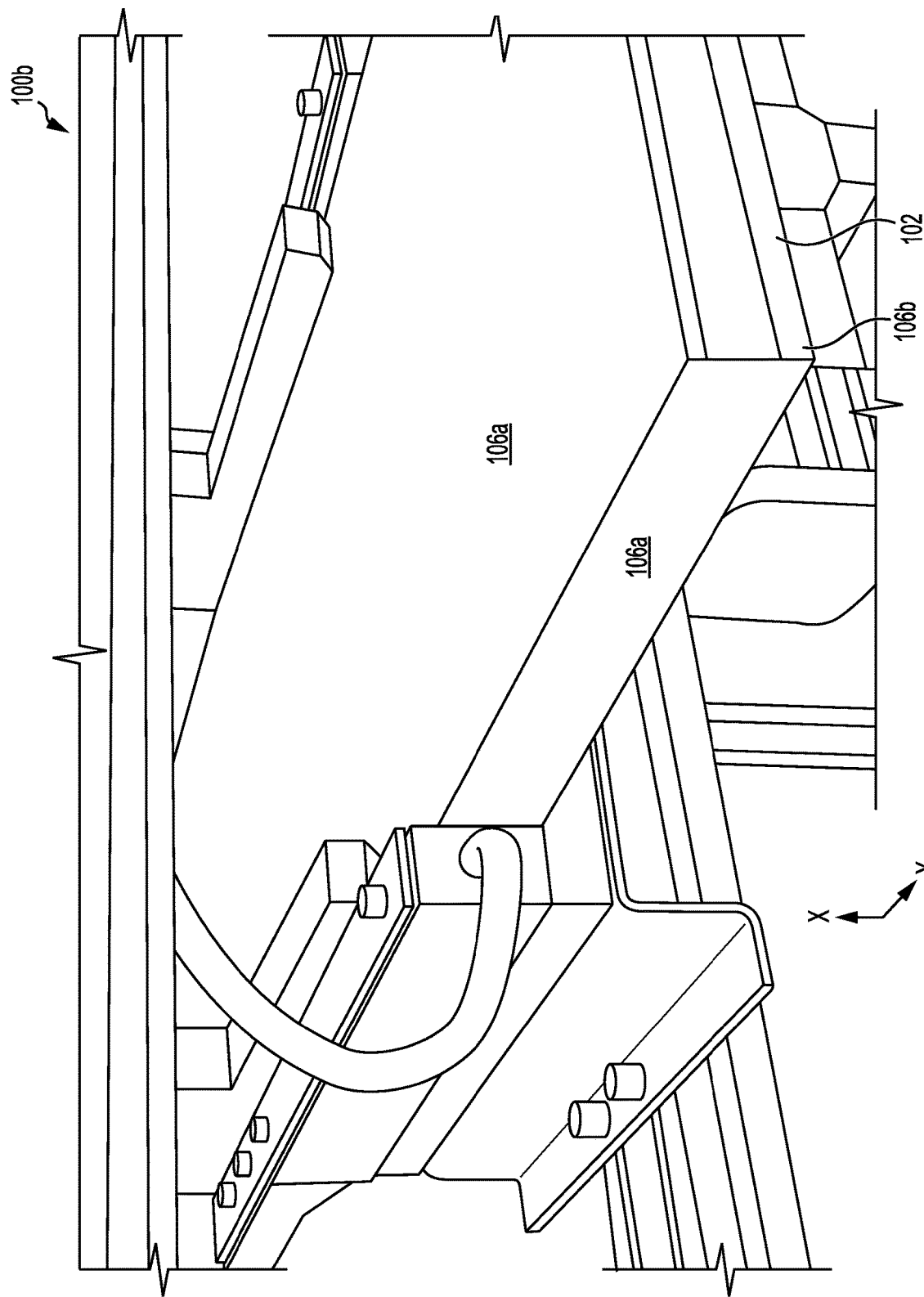
FIG. 2 is a perspective view of the insulation product while its sides are being sealed, according to exemplary embodiments.
Figure 3:
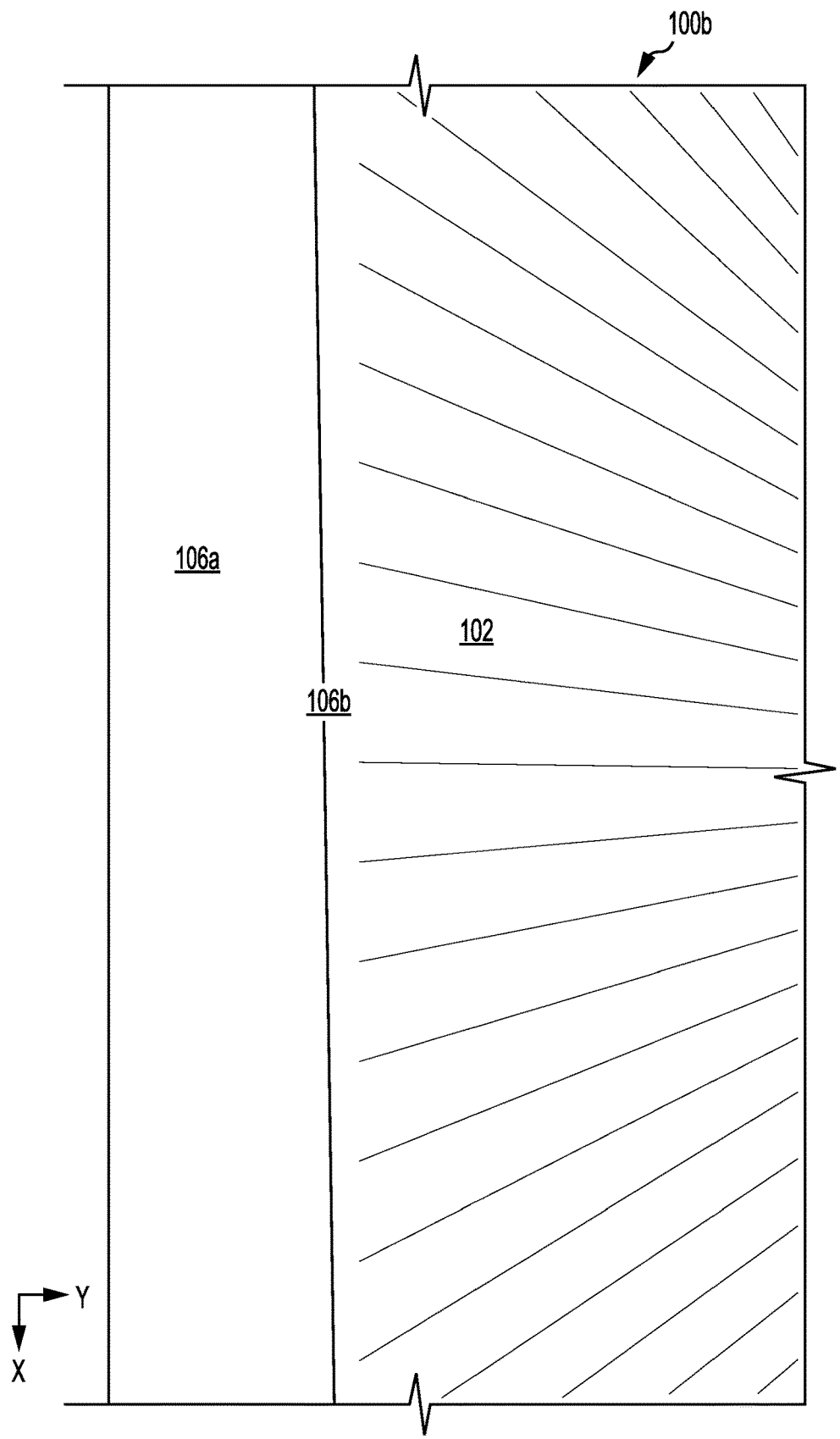
FIG. 3 is a perspective view of the insulation product after the sides are sealed, according to exemplary embodiments.

FIGS. 2 and 3 illustrate a finished insulation product 100b. This figure shows a machine that applies pressure and/or heat to the side and/or the bottom of insulation product 100a to fold down or up and attach a portion of the second layer 106b that extends beyond the side of the first panel 110b to the entire side of the first panel 110b and a portion of the bottom or the top of the first panel to cover a portion of the first layer 102a. Similarly, the machine applies pressure and/or heat to the sides of insulation product 100a to fold down and attach a portion of the fourth layer 106a that extends beyond the side of the second panel 110a to cover the entire side of the second panel 110a and at least a portion of the second layer 102b of the first panel 110b. Put another way, the second layer 106b may overlap the fourth layer 106a like overlapping shingles. The machine attaches the second layer 106b and the fourth layer 106a, which both may include paper (e.g., kraft paper) coated with a heat or pressure activated adhesive (e.g., polymeric film, non-polymeric film, UV activated coating, or wax, or water-based coating, or compostable coating, or recyclable coating), and bond to another surface on contact once heat and/or pressure is applied. In some embodiments, a heat or pressure activated adhesive may be disposed on an inside facing surface of the layer, such that the adhesive may be adjacent to the core layer and overlapped extension portions. Although not shown, multiple panels (e.g., more than two) may be placed together in a similar manner. Additionally, the fourth layer 106a may form a 90-degree fold as shown in FIGS. 2 and 3. However, the second layer 106b may form two 90-degree folds—so that it covers the side surface and the bottom surface of the insulation product.

Figure 4A:
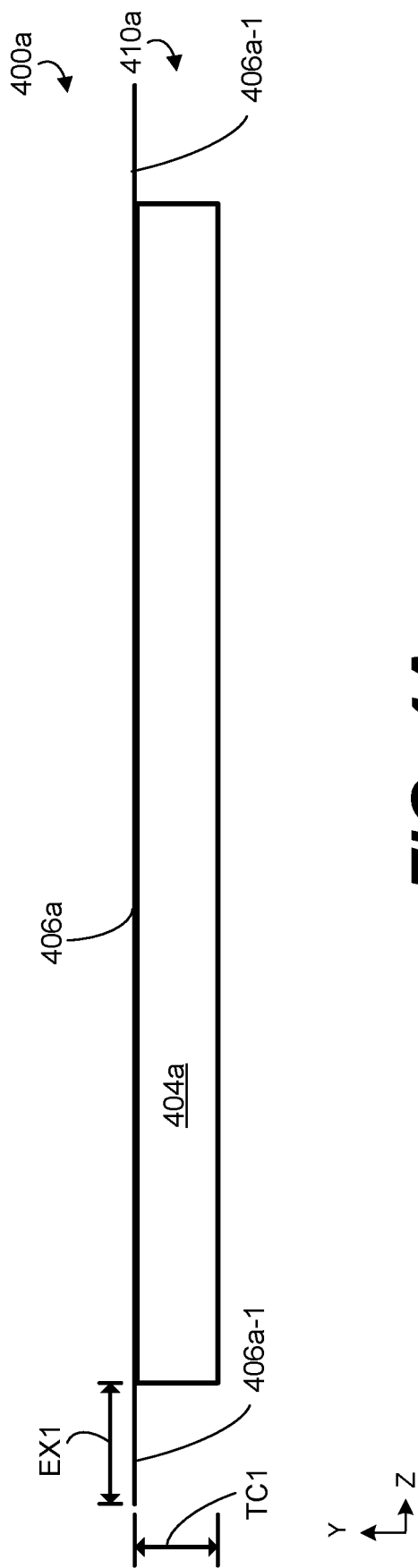
Figure 4B:

FIG. 4A illustrates a front view diagram of insulation product 400a. As shown, insulation product 400a includes a single insulation panel 410a that includes a first layer 406a that extends beyond the side surfaces or two ends of the panel 410a so that the extension portions (in the Z direction) of the first layer 406a may seal the one or more sides of the panel 410a. The first layer 406a may be attached to one or more of the plurality of loops of core layer 404a. Core layer 404a may have a first thickness TC1. First layer 406a may include one or more extension portions 406a-1 having an extension width EX1. The extension width EX1 of each extension portion 406a-1 may be equal to or greater than the first thickness TC1 of core layer 404a. Of note, insulation product 400a does not include an additional or a second layer that is attached to the opposite end of the core layer 404a from the first layer 406a. FIG. 4B illustrates a front view diagram of insulation product 400b. As shown, the portions of the first layer 406a that extend beyond the sides of the panel 410a are folded over, attached, or bonded to the edges or surfaces of the core layer 404a to seal the side to trap air within the insulation product to increase the thermal regulation capabilities (e.g., R-value) of the insulation product. In some embodiments, the insulation product 400a may have an R-value per inch of thickness of the insulation production ranging from 0.5 to 5. As shown, extension portion 406a-1 may be present on more than one side (e.g., two sides of respective core layers 404a) of the insulation product 400a and 400b. FIGS. 4C and 4D are similar to FIGS. 4A and 4B, respectively, except that FIGS. 4C and 4D include two stacked insulation panels in insulation products 400c and 400d. FIG. 4C illustrates a second insulation panel 410b that includes a third layer 406b attached to a core layer 404b. The third layer 406b may extend beyond the side surfaces or two ends of the panel 410b so that the extension portions (in the Z direction) of the third layer 406b may seal the one or more sides of the panel 410b. As shown in FIG. 4D, the third layer 406b may be attached to one or more of the plurality of loops of core layer 404b and may form two 90-degree folds—so that it covers and attaches to at least the bottom surface of the core layer 404b. In some embodiments, the third layer 406b may be attached to one or more of edges of the plurality of loops of core layer 404b (e.g., a side surface of core layer 404b). Additionally, the first layer 406b forms a 90-degree fold and covers and/or attaches to the side surface of the core layer 404a and a portion of the third layer 406b. In some embodiments, first layer 406a is only disposed on and attached to a portion of third layer 406b. In other words, first layer 406a does not attach to or is not disposed on one or more edges of the plurality of loops (e.g., a side surface) of core layer 404a. The width EX1 of first extension portion 406a-1 of first layer 406a may be equal to or greater than a thickness of core layer 404a. Similarly, the width EX2 of second extension portion 406b-1 of third layer 406b may be equal to or greater than a thickness TC2 of core layer 404b. In some embodiments, at least a portion of first extension portion 406a-1 extends and overlaps at least a portion of second extension portion 406b-1. In some embodiments, width EX2 is greater than the width EX1 so that it can cover a portion of a bottom of core layer 404b or a top of core if product was inverted. As shown, extension portions 406a-1 and 406b-1 may be present on more than one side (e.g., two sides of respective core layers 404a, 404b) of the insulation product 400d and 400e.

Figure 4E:
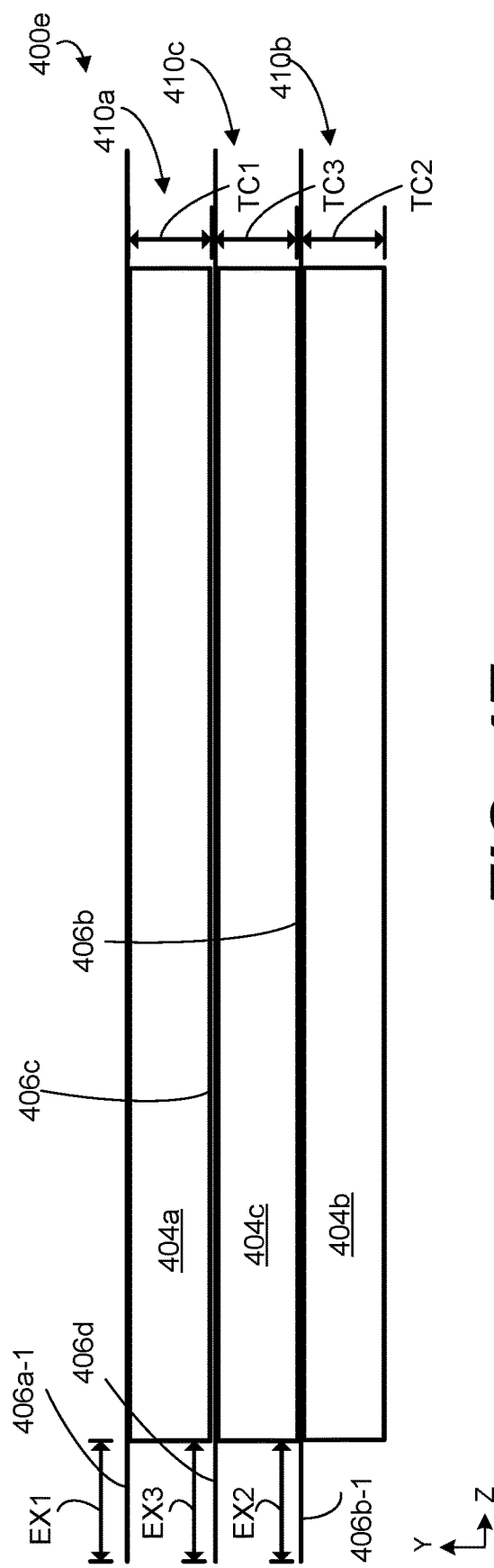
Figure 4F:
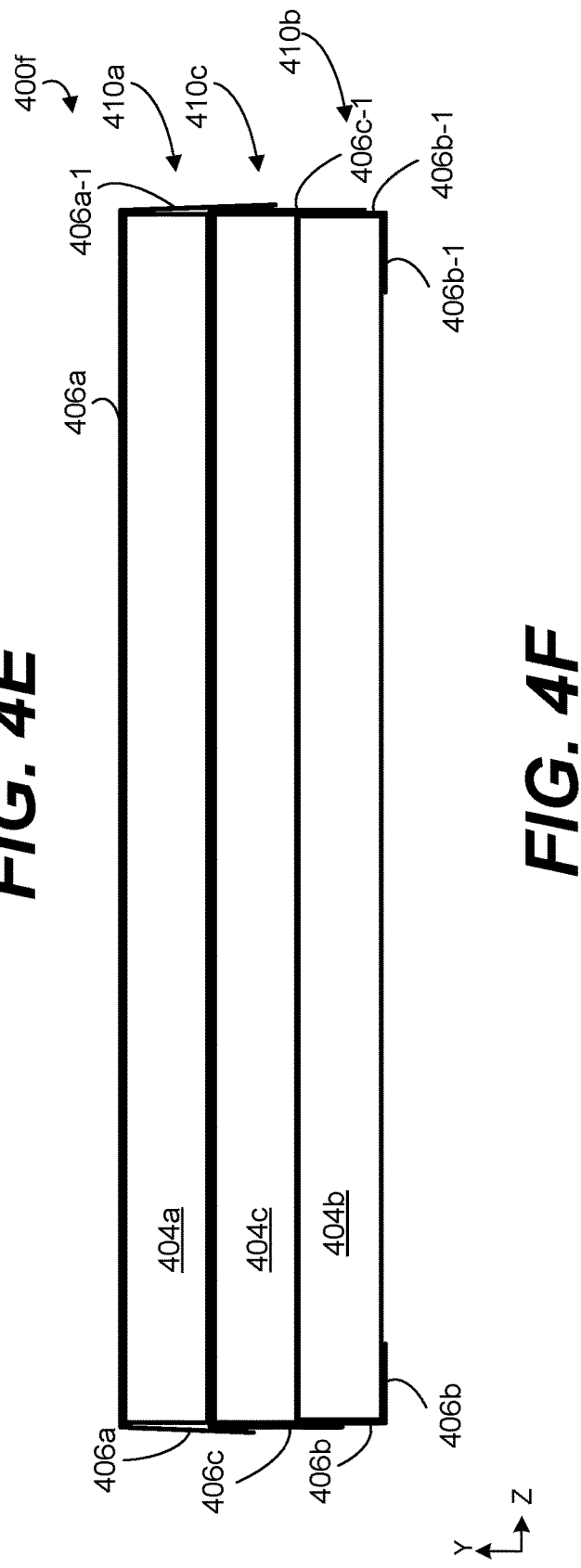

FIGS. 4E and 4F are similar to FIGS. 4C and 4D, respectively, except that FIGS. 4E and 4F include three stacked insulation panels in insulation products 400e and 400f. FIG. 4E illustrates a first panel 410a and a second panel 410b sandwiching a middle insulation panel 410c. The first panel 410a may include a core layer 404a and a first layer 406a attached to one or more of the plurality of loops of core layer 404a. The second panel 410b may include a third layer 406b attached to one or more of the plurality of loops of the core layer 404b. The middle insulation panel 410c may include a middle layer 406c attached to one or more of the plurality of loops of core layer 404c. As shown in FIG. 4E, the third layer 406b may fold down (e.g., 90 degrees) along and attach to the side surface of or more edges of core layer 404b and fold (e.g., another 90 degrees) along and attach to the bottom of the panel 410b. Middle layer 406c may fold down along and attach to the side of insulation panel 410c and a portion of the side surface of 410b such that the middle layer 406c covers a portion of an outer surface of third layer 406b. Similarly, first layer 406a may fold down (e.g., 90 degrees) along and attach to the side of insulation panel 410c and a portion of the side surface of panel 410c such that the first layer 406a covers a portion of an outer surface of middle layer 406c. In some embodiments, first layer 406a is only disposed on and attached to a portion of middle layer 406c. In some embodiments, at least a portion of middle layer 406c is disposed on and attached to a portion of third layer 406b. The width EX1 of first extension portion 406a-1 of the first layer 406a may be equal to or greater than a thickness of core layer 404a. Similarly, the width EX2 of second extension portion 406b-1 of the third layer 406b may be equal to or greater than a thickness TC3 of core layer 404b. Similarly, the width EX3 of third extension portion 406d middle layer 406c may be equal to or greater than a thickness TC2 of core layer 404c. In some embodiments, at least a portion of first extension portion 406a-1 extends and overlaps at least a portion of third extension portion 406d and at least a portion of third extension portion 406d extends and overlaps with a least a portion of second extension portion 406b-1. In some embodiments, width EX2 is greater than width EX1 so that it can cover a portion of a bottom of core layer 404b or a top of core layer 404b if product was inverted. As shown, extension portions 406a-1, 406b-1, and 406d may be present on more than one side (e.g., two sides of respective core layers 404a, 404b, and 404c) of the insulation product 400e and 400f. In some embodiments, the extension portions on opposite sides of (e.g., a first one or extension portion 406a-1 and a second opposite extension 406a-1) may be of the same or different widths.

Figure 4G:
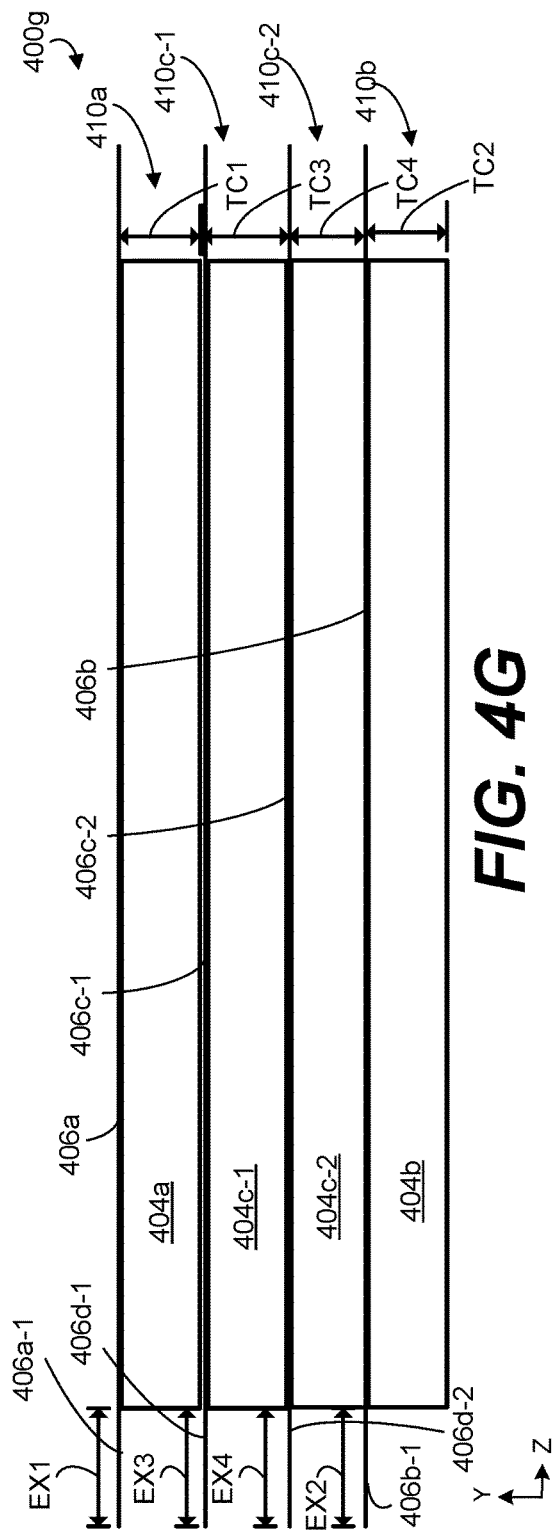
Figure 4H:
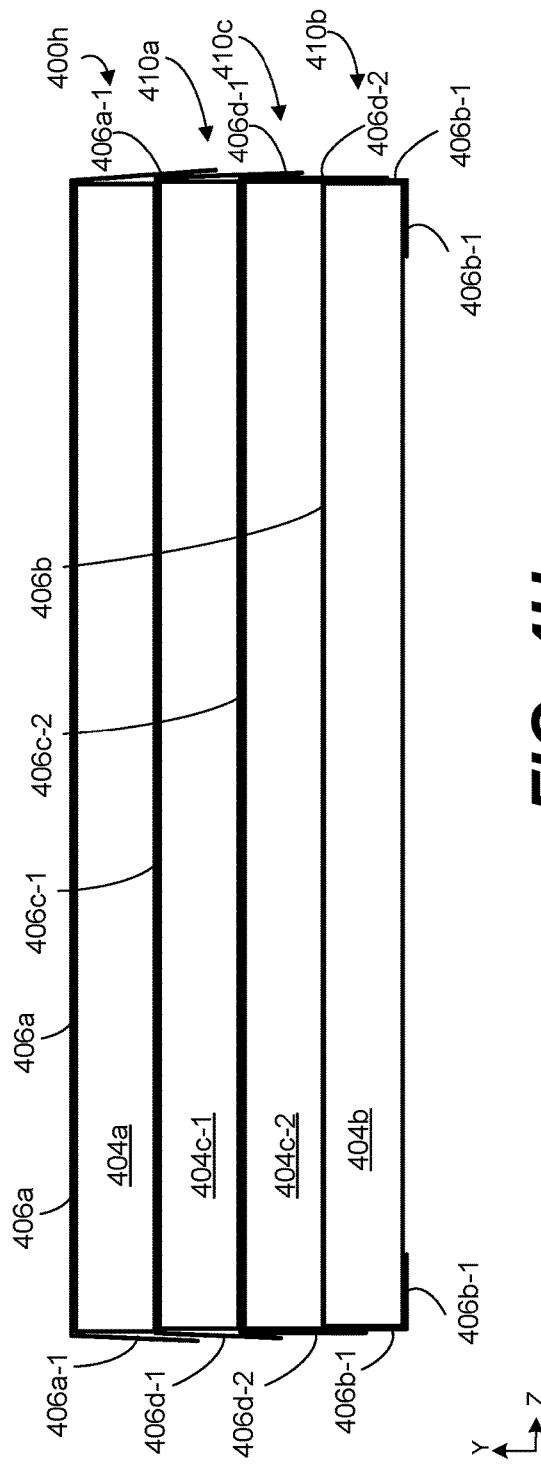
Figure 5C:
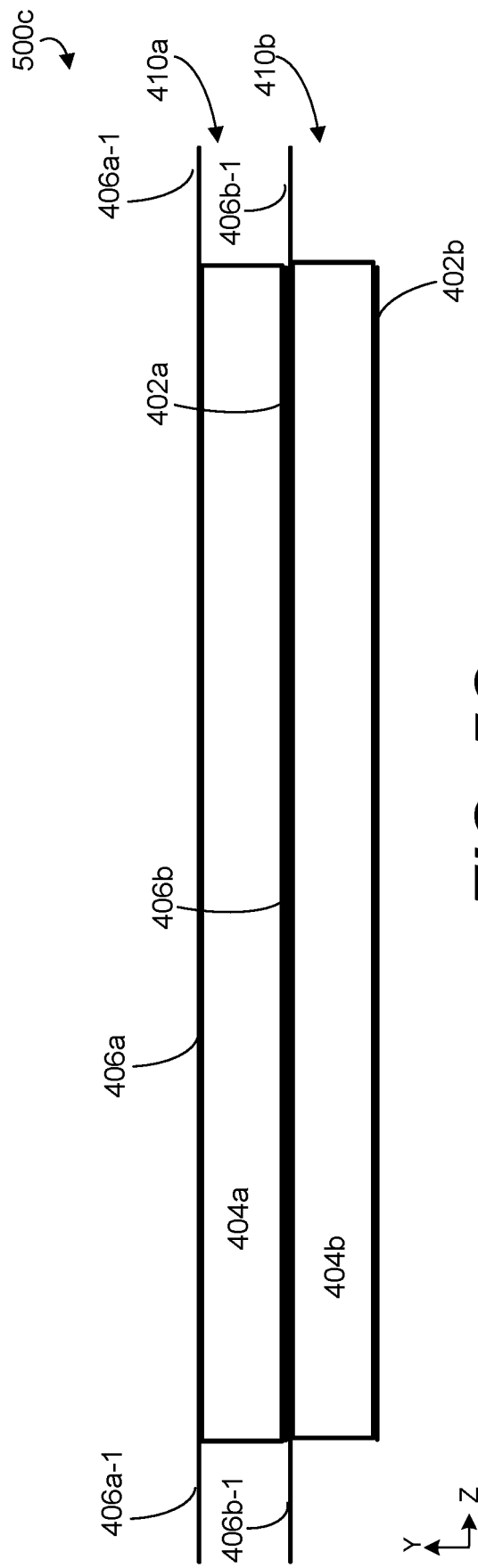
Figure 5D:
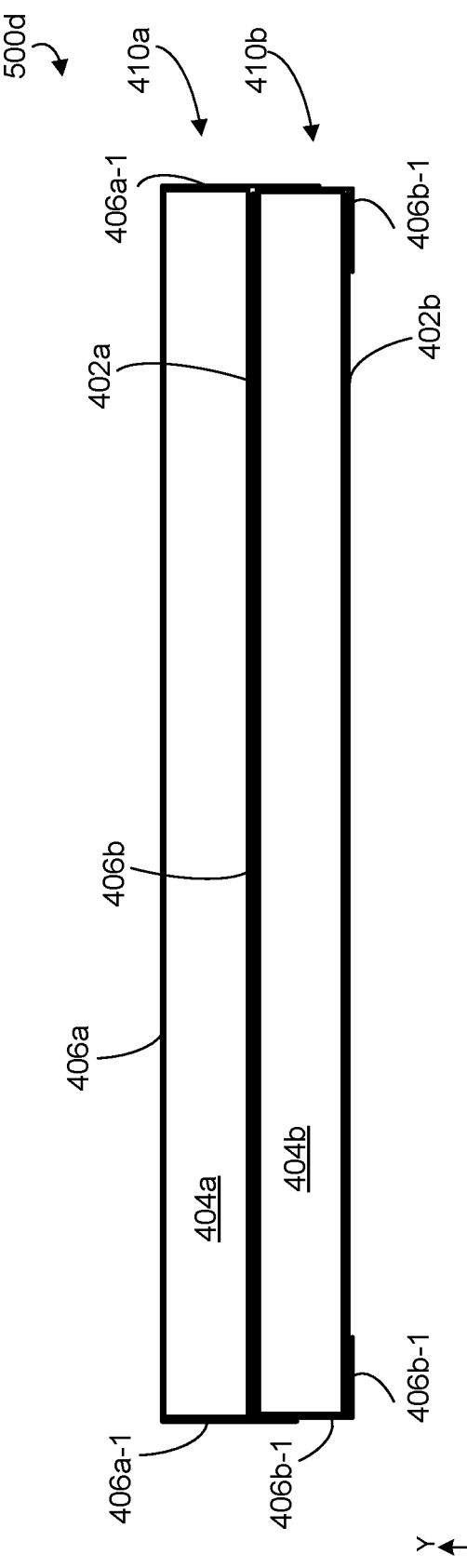

FIGS. 4G and 4H are similar to FIGS. 4E and 4F, respectively, except that FIGS. 4G and 4H include four stacked insulation panels. FIG. 4G illustrates a first panel 410a and a second panel 410b sandwiching two middle insulation panels 410c-1, 410c-2. The first panel 410a may include a core layer 404a and a first layer 406a attached to one or more of the plurality of loops of core layer 404a. The second panel 410b may include a third layer 406b attached to one or more of the plurality of loops of the core layer 404b. The first middle insulation panel 406c-1 may include a first middle layer 406c-1 attached to one or more of the plurality of loops of core layer 404c-1. The second middle insulation panel 406c-2 may include a second middle layer 406c-2 attached to one or more of the plurality of loops of core layer 404c-2. As shown in FIG. 4H, the third layer 406b may fold down (e.g., 90 degrees) along and attach to the one or more edges of core layer 404b (e.g., side surface of core layer 404b) and fold along (e.g., another 90 degrees) and attach to the bottom of the panel 410b. Second middle layer 406c-2 may fold down along and attach to one or more edges of core layer 404c-2 (e.g., side surface of core layer 404c-2) and a portion of an outer side surface of third layer 406b. In some embodiments, second middle layer 406c-2 may not attach to or may not be disposed on one or more edges of the plurality of loops (e.g., a side surface) of core layer 404c-2. First middle layer 406c-1 may fold down along and attach to one or more edges of core layer 404c-1 (e.g., side surface of core layer 404a) such first middle layer 406c-1 covers and is attached to a portion of second middle layer 406c-2. Similarly, first layer 406a may fold down (e.g., 90 degrees) along and attach to one or more edges core layer 404a (e.g., a side of core layer 404a) and a portion of a side surface of first middle layer 406c-1. In some embodiments, a portion of middle layer 406c is disposed on and attached to a portion of third layer 406b. Width EX1 of first extension portion 406a-1 of the first layer 406a may be equal to or greater than a thickness of core layer 404a. Similarly, width EX2 of second extension portion 406b-1 of the third layer 406b may be equal to or greater than a thickness TC2 of core layer 404b. Similarly, width EX3 of extension portion 406d-1 of middle layer 406c may be equal to or greater than a thickness TC2 of core layer 404c. Similarly, width EX4 of extension portion 406d-2 of second middle layer 406c-2 may be equal to or greater than a thickness TC2 of core layer 404c. In some embodiments, at least a portion of first extension portion 406a-1 extends and overlaps at least a portion of extension portion 406d-1 and at least a portion of extension portion 406d-1 extends and overlaps at least a portion of extension portion 406d-2. In some embodiments extension portion 406d-2 extends and overlaps at least a portion of extension portion second extension portion 406b-1. In some embodiments, the width EX2 is greater than widths EX2, EX3, and EX4 so that it can cover a portion of a bottom of core layer 404b or a top of core layer 404b if product was inverted. As shown, extension portions 406a-1, 406b-1, 406d-1, and 406d-2 may be present on more than one side (e.g., two sides of respective core layers 404a, 404b, 404c-1, 404c-2) of the insulation product 400e and 400f. In some embodiments, the extension portions on opposite sides of (e.g., a first one or extension portion 406a-1 and a second opposite extension 406a-1) may be of the same or different widths.

FIGS. 5A-5H illustrate insulation products 500a-500h which are similar to insulation products 400a-400h of FIGS. 4A-4H except each insulation panel (e.g., insulation panels 410a, 410n, 410c, 410c-1, 410c-2) of FIGS. 5A-5H includes an extra layer (e.g., layers 402a, 402b, 402c, 402c-1, 402c-2) opposite the respective core layers (e.g., core layers 404a, 404b, 404c, 404c-1, 404c-2) from the first set of wide layers (e.g., layers 406a, 406b, 406c, 406c-1, 406c-2). The one or more extra layers (e.g., layer 402a) may have a width that is less than the first core layer 404a on one or both ends. For example, the one or more extra layers (e.g., layer 402a) may have a width that is 1-50% less than a width of core layer 404a in order to help the product seal along its sides. In some embodiments, extension portions 406a-1, 406b-1, 406d-1 406d-2, (see also FIG. 4A-4H) of the one or more extra layers may be greater than or equal to the thickness of the core layer layers. Opposing extension portions (e.g., a first extension portion 406a-1 shown on a left side and a second extension portion 406a-1 shown on a right side) may be the same width or a different width.

FIGS. 6A-6H illustrate insulation products 600a-600h similar to insulation products 500a-500h in FIGS. 5A-5H except that the bottom layer 606a and the top layer 602b have extended widths capable of being wrapped around the side and a portion of the opposite surface of the insulation product and attached thereto. In addition, the internal layers (e.g., layers 606c, 606c-1, 606c-2, 606b, 602a) and core layers (e.g., layers 604a, 604c, 604c-2, 604b) all have widths that are less than the bottom and top layers 606a, 602b. In some embodiments, the internal layers all have the same width. In some embodiments, one or more internal layers (e.g., layers 606c, 606c-1, 606c-2, 606b, 602a) may be omitted so that one or more core layers (e.g., 604a, 604c, 604c-2, 604b) may be open faced. In some embodiments and referring to FIG. 6G, the extension portion 606a-1 of layer 606a may be greater than or equal to a total core layer thickness TC2 of the insulation product 600a-600h (e.g., a thickness of one or more core layers 604a, 604c-1, 604-2, and 604*b*, one or more internal layers 606*c*-1, 606*c*-2, and 606*b*, bottom layer 606*a*, and/or top layer 602*b*).

Figure 7:
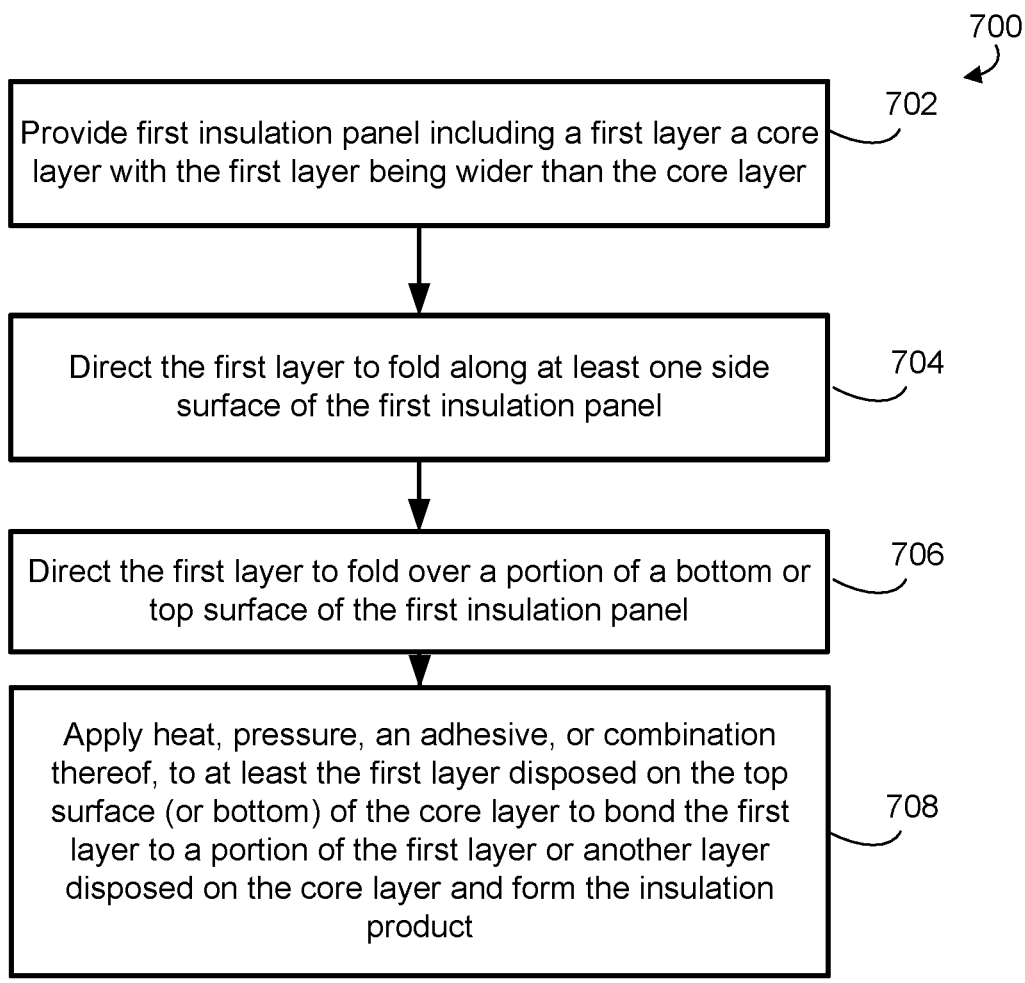
FIGS. 7 and 8 are flowcharts of methods for making an insulation product according to exemplary embodiments.

FIG. 7 is a flowchart that illustrates an exemplary method 700 for making an insulation or cushioning product such as insulation product 400*b*. In block 702, method 700 may include providing first insulation panel 410*a* including first layer 406*a* and first core layer 404*a* where the first layer 406*a* has a width greater than the first core layer 404*a*. In block 704, the method 700 may include directing the first layer 406*a* to fold (e.g. up or down) along at least one side surface of the first insulation panel 410*a*. In block 706, the method 700 may include directing the first layer 406*a* to fold over a portion of a bottom or top surface of the first insulation panel 410*a*. In block 708, may include applying heat, pressure, an adhesive, or combination thereof, to at least a bottom or top surface of first core layer 404*a* (or an internal surface of first layer 406*a* if adhesive is applied) to bond the first layer 406*a* to a portion of the first core layer 404*a* or another layer disposed on the first core layer 404*a* and form the insulation product. In some embodiments, the method may include applying heat, pressure, an adhesive, or combination thereof, to at least a bottom or top surface of first insulation panel 410*a* to bond the first layer 406*a* to respective surfaces and form the insulation product 400*b*.

In some embodiments, the first insulation panel 410*a* may include a second layer 402*a* disposed on an opposite surface of the first core layer 404*a* compared to the first layer 406*a* and having a width that is less than a width of the first layer 406*a*. In some embodiments, applying heat, pressure, the adhesive or combinations thereof to the at least one side surface of the first insulation panel 410*a* includes bonding a portion of the first layer 406*a* to a portion of the second layer 402*a* disposed on the at least one side surface of the first insulation panel 410*a*.

In some embodiments, the method may include providing a second insulation panel 410*b* including a third layer 406*b* and a second core layer 404*b*, and the third layer 406*b* being wider than the second core layer 404*b* in the Z-direction. The method 7000 may also include stacking the first and second insulation panels 410*a*, 410*b* and aligning the first and second insulation panels 410*a*, 410*b*. For example, method 700 stop the first insulation panel using an alignment stop (described below) and a stacking mechanism place one or more insulating panels above or below the stopped insulation panel to create the stacked product. In some embodiments, the method includes placing one or more insulating panels over another one or more insulation panels. In other embodiments, one or more first insulation panels are placed underneath one or more second insulation panel by lifting or partially lifting a portion of one or more second insulation panels. Put another way, insulation panels 410*a*, 410*b* can be shingled, upstacked, downstacked, or stacked using a pick-and-place process such as robotic arms, vacuum-assist end-of-arm tooling, etc.

Method 700 may also utilize side guides (described below) used in conjunction to help align the insulation or cushioning product as it is moved. The first insulation panel may include a fourth layer 402*b* disposed on an opposite surface of the second core layer 404*b* compared to the third layer 406*b* and having a width that is less than a width of the third layer 406*b*. The method may include applying heat, pressure, the adhesive, or combination thereof, to side surfaces of the first and second insulation panels 410*a*, 410*b*, and a bottom or top surface of first insulation panel 410*a* to bond the first and third layers 406*a*, 406*b* to respective surfaces and form the insulation product 500*d*.

In some embodiments, the method may include providing one or more middle insulation panels 404*c*, 404*c*-1, 404*c*-2 including a first middle layer 406*c*/406*c*-1 and a middle core layer 404*c*/404*c*-1, the first middle layer 406*c*/406*c*-1 being wider than the middle core layer 404*c*/404*c*-1 in the Z-direction. The method may include stacking the one or more middle insulation panels 410*c*, 410*c*-1, 410*c*-2 with the first and second insulation panels 410*a*, 410*b* and aligning the one or more middle insulation panels 410*c*, 410*c*-1, 410*c*-2 with the first and second insulation panels 410*a*, 410*b*. Each of the one or more middle insulation panels 410*c*, 410*c*-1, 410*c*-2 may include a second middle layer disposed on an opposite surface of the middle core layer 404*c*/404*c*-1, 404*c*-2 compared to the first middle layer 406*c*/406*c*-1 and having a width that is less than a width of the first middle layer 406*c*/406*c*-1.

Figure 8:
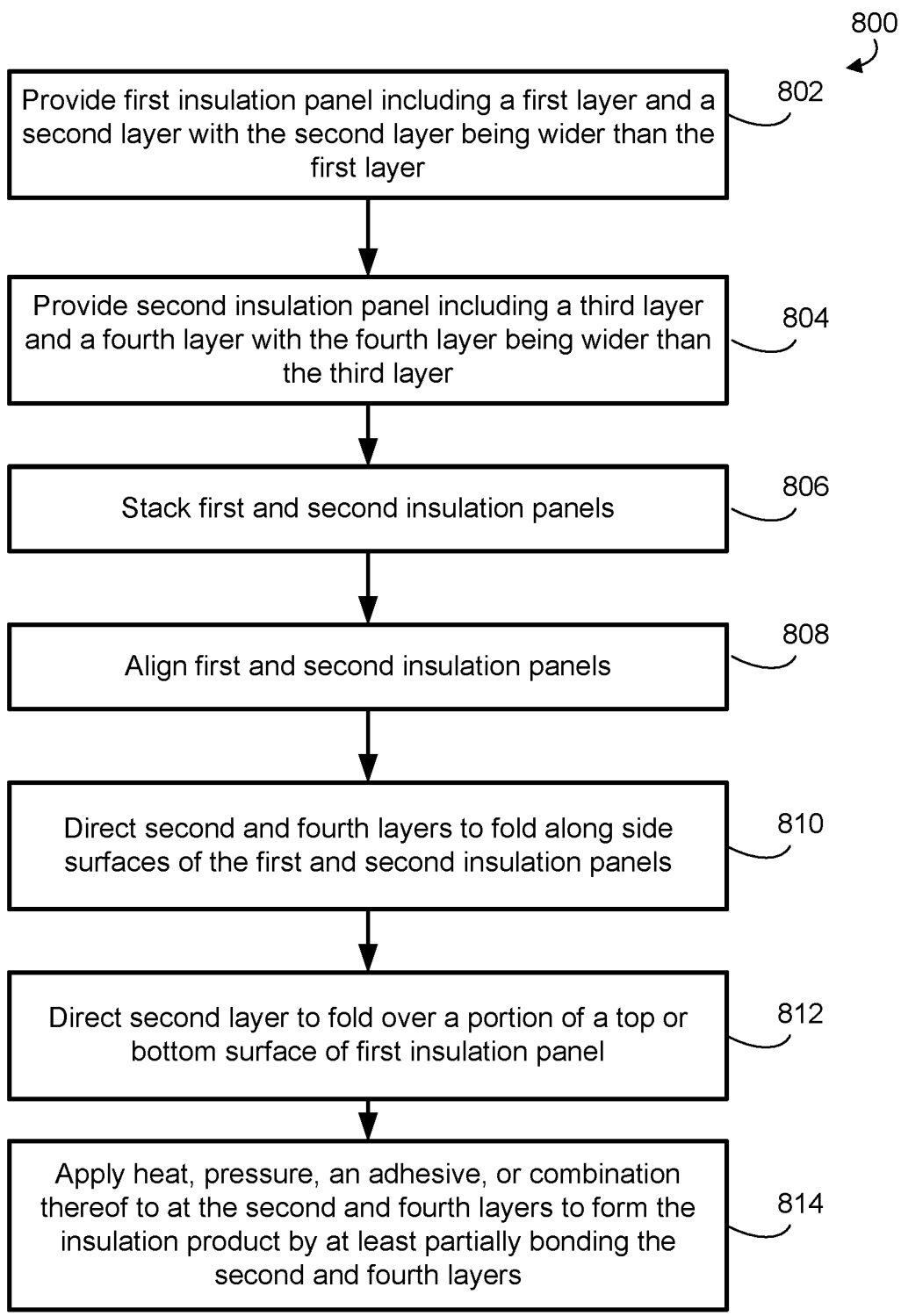

FIG. 8 is a flowchart that illustrates an exemplary method 800 for making insulation product 100*b*. In block 802, method 800 may include providing first insulation panel 110*b* including first layer 102*b*, first core layer 104*b*, and second layer 106*b* with the second layer 106*b* being wider than the first layer 102*b* in the Z-direction. In block 804, method 800 may include providing second insulation panel 110*a* including third layer 102*a*, second core layer 104*a*, and fourth layer 106*a* with the fourth layer 106*a* being wider than the third layer 102*a* in the Z-direction. In block 806, method 800 may include stacking first and second insulation panels 110*b*, 110*a*. In block 808, method 800 may include aligning first and second insulation panels 110*b*, 110*a* once they are stacked. In block 810, method 800 may include directing second and fourth layers 106*b*, 106*a* to fold down alongside surfaces of the first and second insulation panels 110*b*, 110*a* such that the fourth layer 106*a* overlaps the second layer 106*b*. In block 812, method 800 may include directing second layer 106*b* to fold over a portion of a bottom surface of first insulation panel 110*b*. In block 814, method 800 may include applying heat, pressure, an adhesive, or a combination thereof to at the second and fourth layers to form the insulation product by at least partially bonding the second and fourth layers. In some embodiments, block 814 of method 800 may include applying heat, pressure, an adhesive, or a combination thereof to at least the top or bottom surface of first insulation panel 110*b* to bond the second and fourth layers 106*b*, 106*a* to respective surfaces. In some embodiments, the second layer 106*b* is folded over the side of panel 110*b* before the fourth layer 106*a* is folded over to cover the second layer 106*b*. In some embodiments, the second layer 106*b* is folded over the side of panel 110*b* at the same time or nearly the same as the fourth layer 106*a* is folded over to cover the second layer 106*b*. Similarly, block 814 may occur simultaneously or near simultaneously with blocks 810 and 812.

FIGS. 9A-9D illustrate insulation products 900*a*-900*d* similar to insulation products 600*c*-600*f* in FIGS. 6C-6F except that only the bottom layer 902*b* has an extended width capable of being wrapped around both sides and two portions of the opposite surface of the insulation product and attached thereto. In addition, the internal layers (e.g., layers 906*a*-1, 906*a*-2, 906*a*-3) and core layers (e.g., layers 904*a*, 904*b*, 904*c*0, all have widths that are less than the bottom layer 904. In some embodiments, the internal layers all have the same width. In some embodiments, one or more internal layers have widths less than the core layers (e.g., layers 904*a*, 906*b*, 904*c*). In some embodiments, one or more core layers (e.g., layers 904*a*, 904*b*, 904*c*) are open face meaning one or more internal layers (e.g., layers 906*a*-1, 906*a*-2, 906*a*-3) are omitted. Although only two or three core layers are shown as being stacked, four or more core layers may be stacked. In some embodiments and referring to FIG. 9C, the extension portion 902*b*-1 of layer 902*a* may be greater than or equal to a total core layer thickness TC2 of the insulation product (e.g., a thickness of core layers 904*c*, 904*b*, and 904*a*).

FIGS. 10A-10E illustrate an exemplary machine 1000 for making stacked insulation and/or cushioning products. Machine 1000 may include a conveyor assembly 1002. The conveyor assembly 1002*a* may include one or more first conveyor belts 1003 configured to receive and transport one or more products to a stacking assembly 1005. Machine 1000 may include stacking assembly 1005 configured to create a stacked product from two or more insulation products. Stacking assembly 1005 may include an alignment stop 1006 configured to prevent the one or more insulation products from being transported for a predetermined about of time. Stacking assembly 105 may also include a stacking mechanism configured to stack one or more insulation products above or below one or more insulation products that are stopped by the alignment stop 1006 to create the stacked product. For example, machine 1000 may include a pick-and-place mechanism or device 1015 (shown in FIG. 10B) configured to place at least one insulation product over one or more insulation products to create the stacked product. As another example, machine 1000 may include a robotic arm 1017 (shown in FIG. 10B) configured to place one or more insulation products over one or more insulation products to create the stacked product.

For example, a tilt arm 1004 may be configured to tilt a portion of the one or more insulation products for the predetermined amount of time such that at least one insulation product may be stacked underneath the one or more insulation products to create the stacked product. In some examples, machine 1000 may include alignment stop 1006 and tilt arm 1004 spaced apart a first distance. Machine 1000 may have settings (e.g., using computing device 1100 described below) that allow alignment stop 1006 and tilt arm 1004 to be spaced apart a second distance that is more or less than the first distance. In some embodiment, an additional timing belt with a catch-lug can be used to positively transport panel from the stacking assembly 1005 to the sealing assembly 1007. In other embodiments, conveyor assembly 1002 may not be needed if panels are stacked using a pick-and-place method such as robotics and/or vacuum-assist tooling. Machine 1000 may include the sealing assembly 1007, which may be height-adjustable to product panels of varying thicknesses. Sealing assembly 1007 may include one or more third conveyor belts 11020*a* and one or more fourth conveyor belts 1020*b* positioned below the one or more third conveyor belts 1020*a*. In some embodiment, the conveyor belts are constructed from a high-coefficient of friction materials, such as rubber, to ensure optimal positive control on the product. In some embodiments, conveyor belts 1020*a*, 1020*b*, may be replaced by driven or non-driven rollers. In other embodiments, only one conveyor belt is needed. In other embodiments, conveyor belts 1020*a*, 1020*b* may not be needed and may be replaced by a static hold-down mechanism that prevents the panels from buckling as it is being sealed. Machine 100 may include one or more heaters (e.g., first top heater 1012*a*, second side heater 1012*b*, third top heater 1014*a*, fourth side heater 1014*b*) configured to heat and seal an outer layer (e.g., layer 902*b*) along at least a portion of a top of the stacked product and optionally a portion of the side of the stacked product. Machine 1000 may include side guides 1008*a*, 1008*b* to help align the insulation or cushioning product as it travels along the first plurality of conveyor belts 1003. Side guides 1008*a*, 1008*b* can be manually or automatically adjusted to fit products of different widths.

Figure 10A:
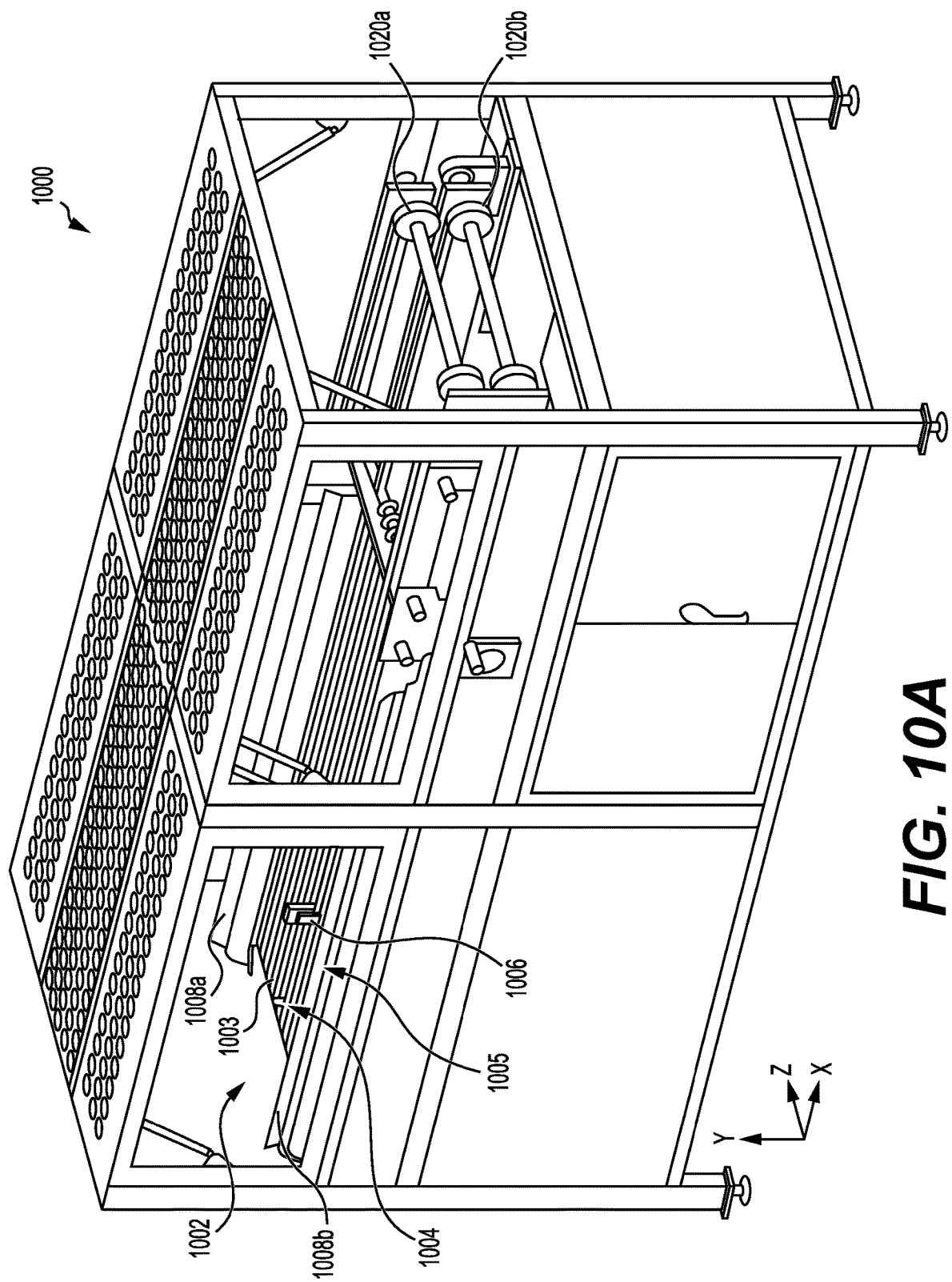
FIG. 10A is a perspective view of a machine for making stacked insulation products, according to exemplary embodiments.
Figure 10B:
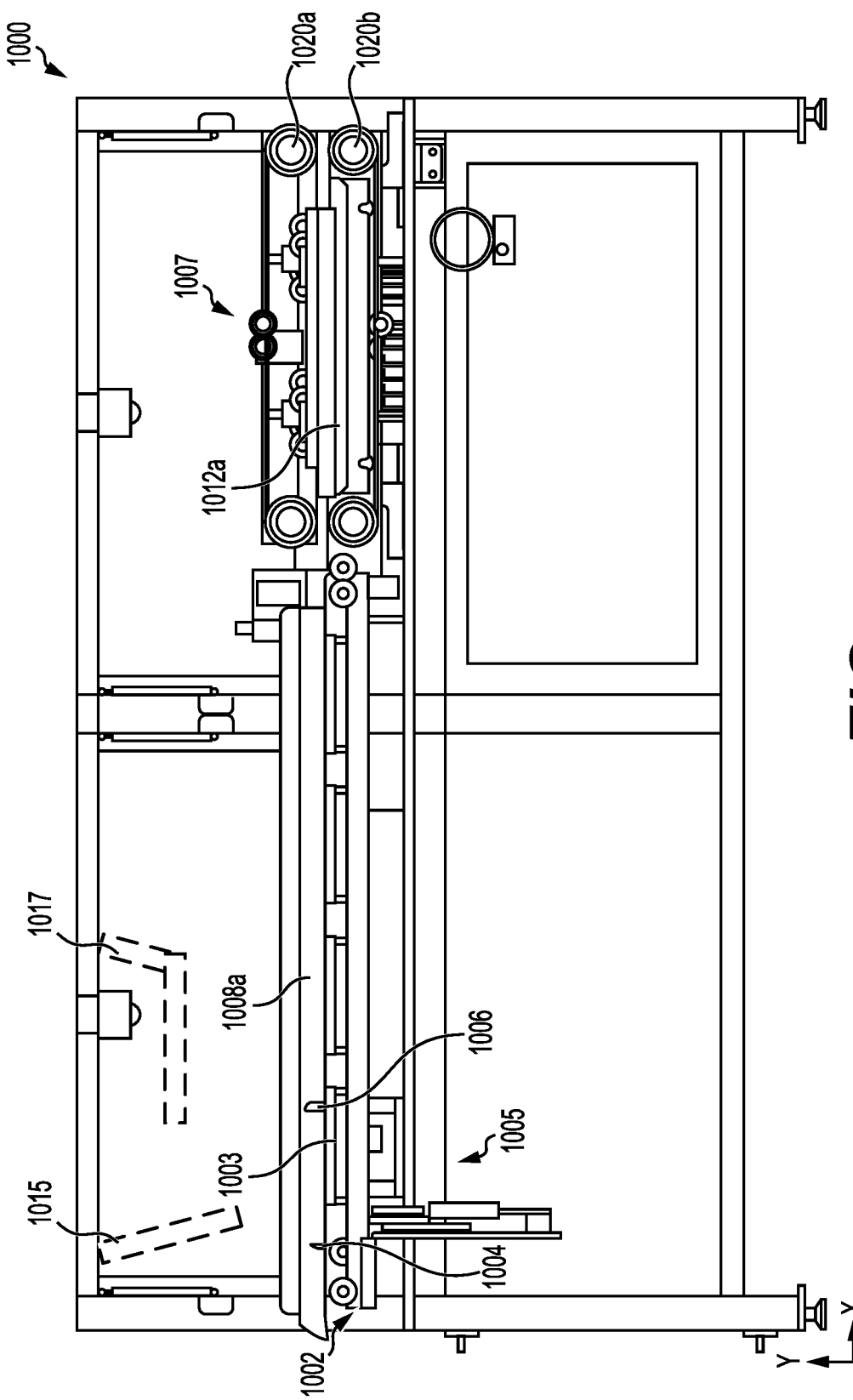
FIG. 10B is a cutaway side view of the machine of FIG. 10A.
Figure 10C:
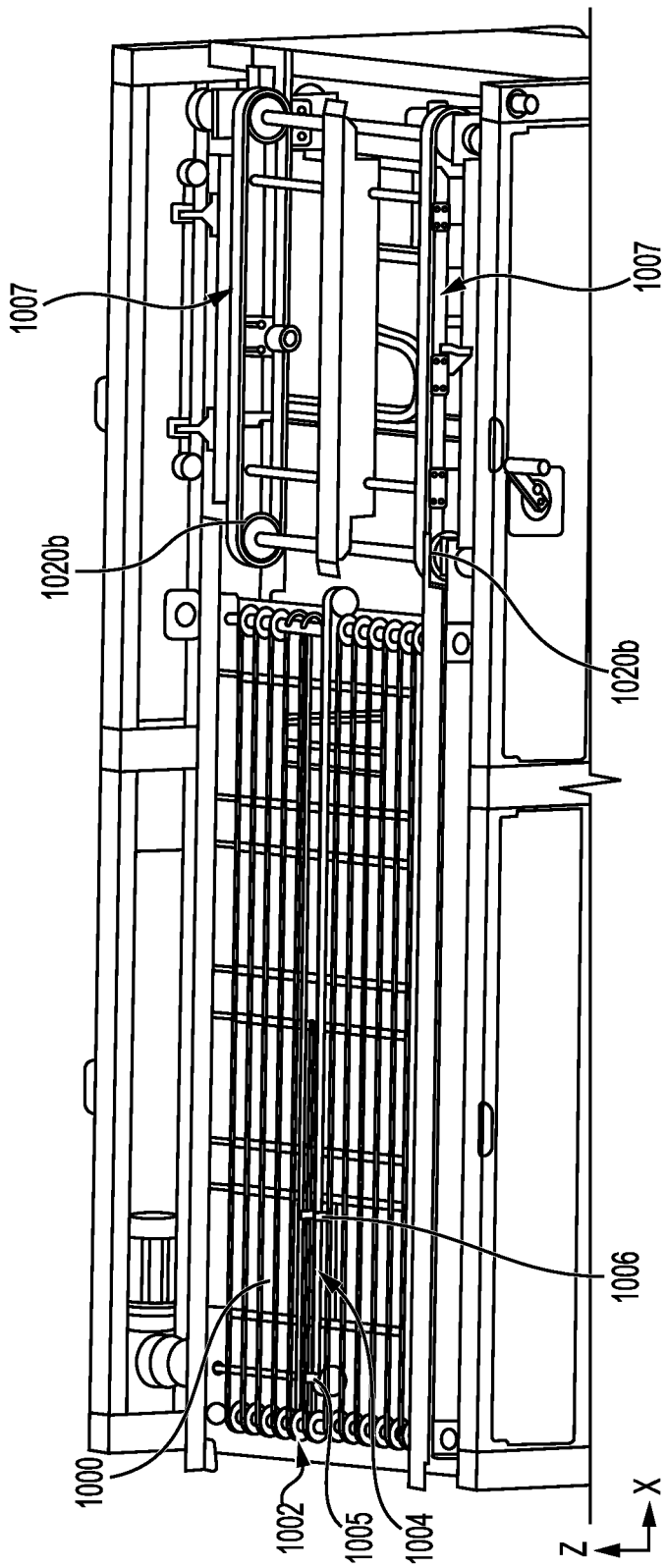
FIG. 10C is a cutaway top view of the machine of FIG. 10A.
Figure 10D:
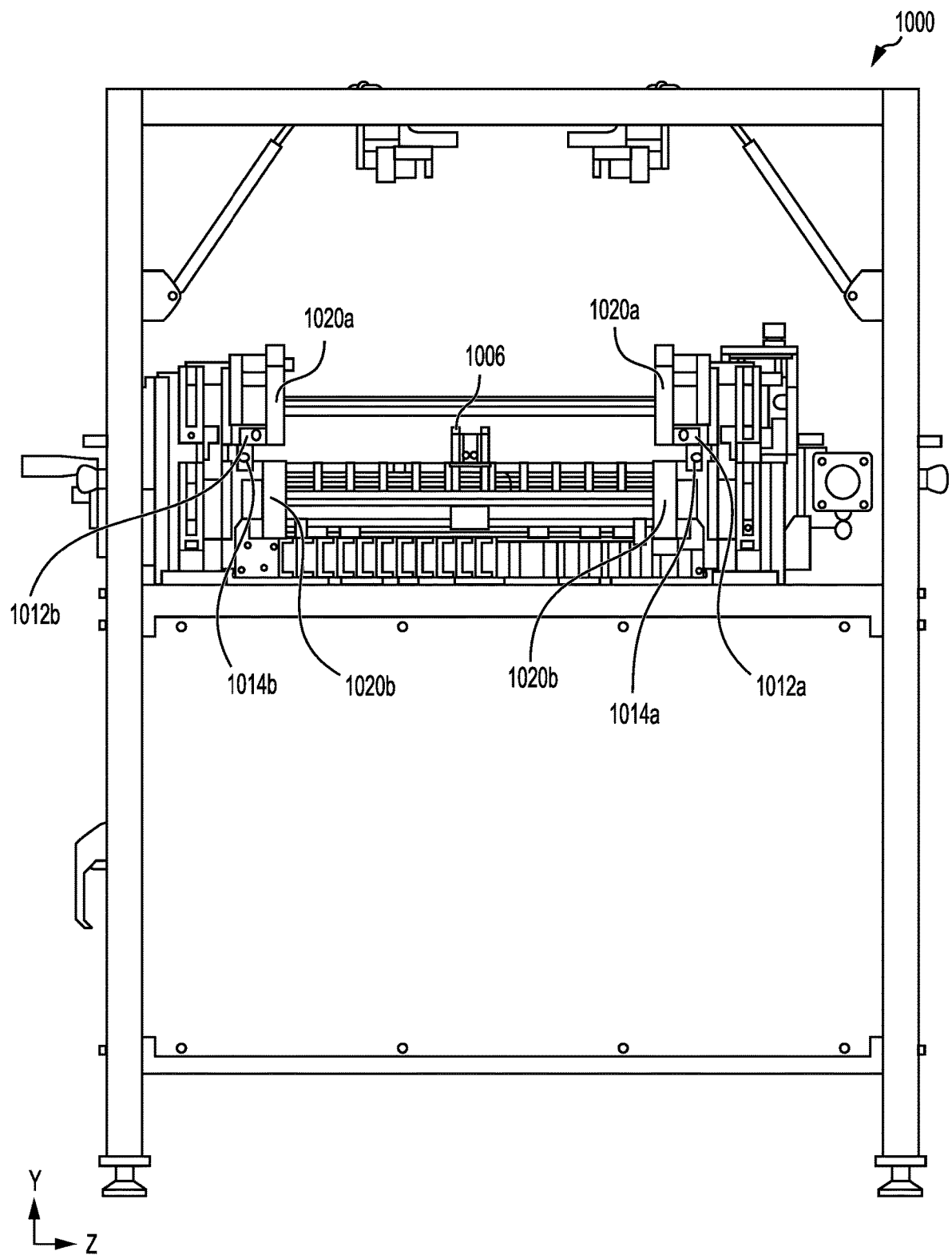
FIG. 10D is a front view of the machine of FIG. 10A.
Figure 10E:
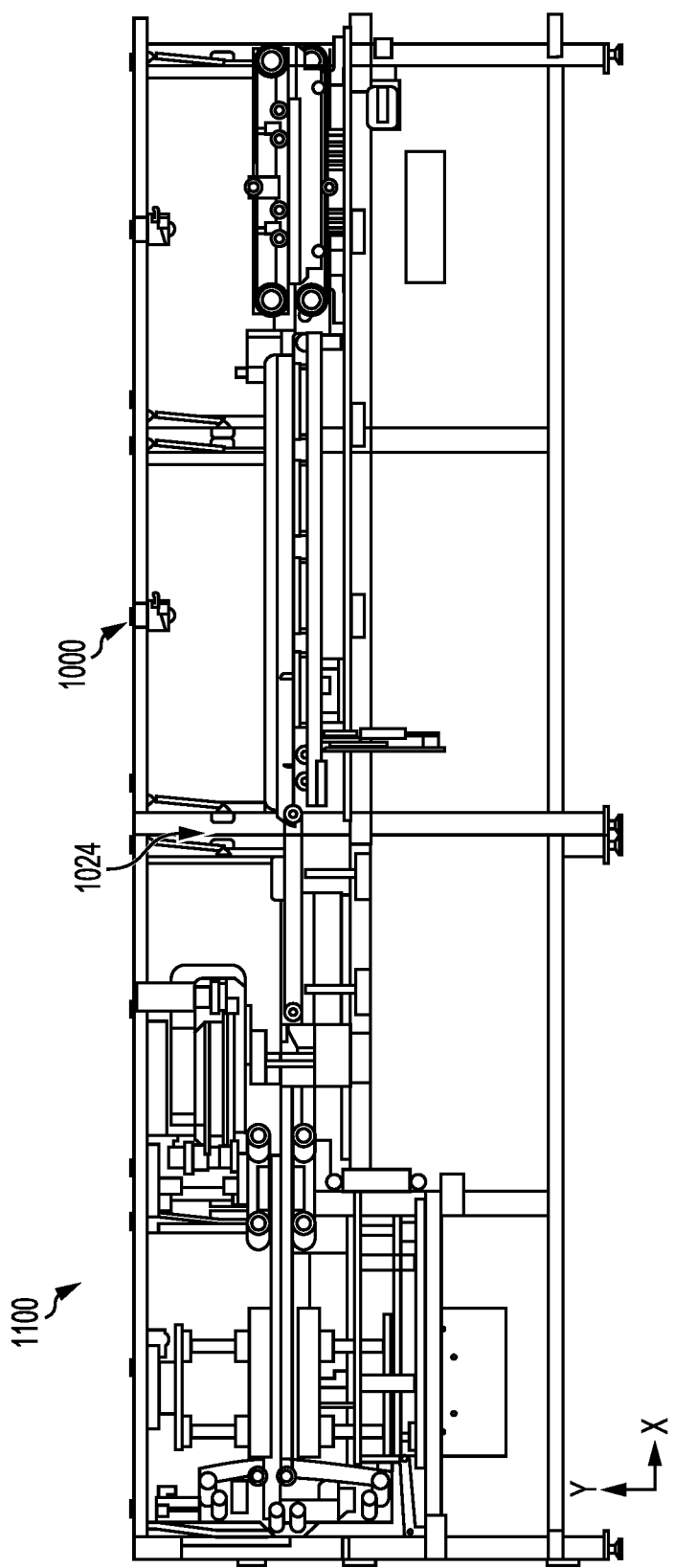
FIG. 10E is a cutaway sideview of the machine if FIG. 10A showing it in modular connection to a machine for making insulation products.

As shown in FIG. 10E, machine 1000 may be a modular unit that is able to bolt on or otherwise connect with another machine (e.g., machine 1100) capable of making a non-stacked insulation product.

In some embodiments, machine 1000 may be configured to stack one or more insulation products on top of one or more stationary insulation products rather than placing the one or more insulation product beneath the stationary insulation product.

Figure 11:
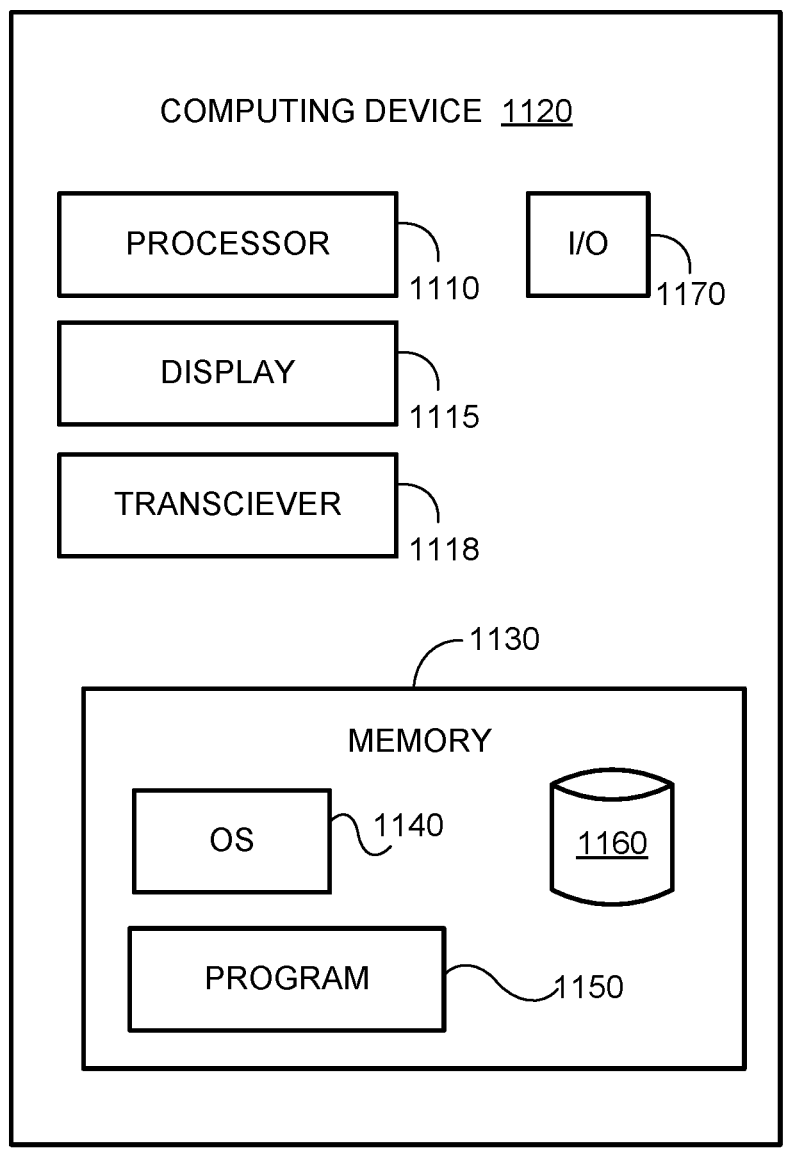
FIG. 11 is a block diagram of computing system used to control the machine, according to exemplary embodiments.

As shown in FIG. 11, machine 1000 may include or be used with computing device (e.g., a terminal, laptop, computer, mobile computing device, etc.) 1120 that includes one or more processors 1110, memory 1130 (which may include an operating system 1140, one or more programs 1150, and a database 1160), display 1115, transceiver/antenna 1118, input/output device 1170 (e.g., keyboard, mouse, touch screen, wired connection to another computing device), and other computer components to enable machine 1000 to provide real-time data (e.g., production data, and diagnostic data) to one or more connected computing devices or remote computing devices with similar components. In some embodiments, the one or more processors 1110 may be distributed to one or more remote computers or servers with similar components. In some embodiments, a user will enter a destination of a package and item size with input/output device 1170, and the one or more processors 1110 of computing device 1120 will optimally produce insulation product for shipping based on received or retrieved weather forecasts as well as a distance or time required for a package to reach its destination. For example, computing device 1120 may cause machine 1000 to not stack insulation product together for distances of less than a first threshold distance (e.g., 10 miles) with a daytime average temperature below a first average temperature threshold (e.g., 50° F. or less). However, for distances greater than the first threshold distance under the same temperature conditions computing device 1120 may determine that a stack of two insulation products is necessary and cause the machine 1000 to stack the two insulation products.

Although exemplary products described herein are referred to as insulation products. The insulation products may be used for cushioning or packaging without need for thermal insulation capabilities.

Examples of the present disclosure can be implemented according to at least the following clauses:

Clause 1: An insulation product, comprising: a first panel comprising: a second layer having a second width and comprising one or more extension portions; and a core layer having a first width less than the second width and comprising a first continuous paper sheet formed into a first plurality of flexible loops disposed on and attached to the second layer and defining a first plurality of air channels that extend in a direction that is substantially perpendicular with a length direction of the first panel, wherein the second layer covers at least a portion of one or more edges of the core layer and covers at least a portion of a top or bottom surface of the core layer, wherein the one or more extension portions have an extension width greater than or equal to a thickness of the core layer.

Clause 2: The insulation product of clause 1, wherein the first panel further comprises: a first layer having a third width, the third width being less than the second width, wherein the first layer is attached to the first plurality of flexible loops; wherein the second layer overlaps a portion of the first layer disposed at the planar surface of the first panel.

Clause 3: The insulation product of clause 1 or 2, further comprising: a second panel comprising: a fourth layer having a fourth width; and a second continuous paper sheet formed into a second plurality of flexible loops disposed on and attached to the fourth layer, and defining a second plurality of air channels that extend in a direction that is substantially perpendicular with a length direction of the second panel, wherein the fourth layer covers at least a portion of a side surface of the second panel of the second panel and covers a portion of the second layer disposed on the side surface of the first panel.

Clause 4: The insulation product of clause 3, wherein the first panel further comprises: a third layer having a third width, the third width being less than the fourth width, and wherein the third layer is attached to the second plurality of flexible loops.

Clause 5: The insulation product of clause 3 or 4, wherein the first and second panels are stacked.

Clause 6: The insulation product of clause 1, further comprising: a second panel comprising: a fourth layer having a fourth width; and a second continuous paper sheet formed into a second plurality of flexible loops disposed on and attached to the fourth layer, and defining a second plurality of air channels that extend in a direction that is substantially perpendicular with a length direction of the second panel, one or more middle panels each comprising: a second middle layer having a second middle width; and a middle continuous paper sheet formed into a middle plurality of flexible loops disposed on and attached to the second middle layer, and defining a middle plurality of air channels that extend in a direction that is substantially perpendicular with a length direction of the one or more middle panels, wherein the second middle layer covers at least a portion of a side surface of an adjacent middle panel or the first panel, and wherein the fourth layer covers at least a portion of a side surface of the second panel and a portion of the second middle layer of a first middle panel of the one or more middle panels.

Clause 7: The insulation product of any of clauses 1 to 6, wherein the insulation product has an R-value per inch of thickness of 0.5 to 5.0.

Clause 8: A method of forming an insulation product, comprising: providing a first insulation panel comprising a first layer and a first core layer with the first layer being wider than core layer in a Z-direction, the first layer comprising one or more extension portions having an extension width equal to or greater than a thickness of the first core layer; directing the first layer to fold along one or more edges of the first core layer; directing the first layer to fold over a portion of a top surface of the first core layer; applying heat, pressure, an adhesive, or combination thereof, to at least the top surface of first core layer to bond the first layer to respective surfaces and form the insulation product.

Clause 9: The method of clause 8, wherein first insulation panel further comprises a second layer disposed on an opposite surface of the first core layer than the first layer and having a width that is less than a width of the first layer and applying heat, pressure, the adhesive or combinations thereof to the at least one side surface of the first insulation panel comprises bonding a portion of the first layer to a portion of the second layer disposed on a top surface of the first core layer.

Clause 10: The method of clause 8 or 9, further comprising: providing a second insulation panel including a third layer and a second core layer, and the third layer being wider than the second core layer in the Z-direction; stacking the first and second insulation panels; and aligning the first and second insulation panels.

Clause 11: The method of clause 10, wherein the second insulation panel further comprises a fourth layer disposed on an opposite surface of the second core layer than the third layer and having a width that is less than a width of the third layer.

Clause 12: The method of clause 11, further comprising applying heat, pressure, the adhesive, or combination thereof, to side surfaces of the first and second insulation panels and a bottom or top surface of first insulation panel to bond the first and third layers to respective surfaces and form the insulation product.

Clause 13: The method of any of clauses 10-12, further comprising: providing one or more middle insulation panels including a first middle layer and a middle core layer, the first middle layer being wider than the middle core layer in the Z-direction; stacking the one or more middle insulation panels with the first and second insulation panels; and aligning the one or more middle insulation panels with the first and second insulation panels.

Clause 14: The method of clause 13, wherein each of the one or more middle insulation panel further comprise a second middle layer disposed on an opposite surface of the middle core layer than the first middle layer and having a width that is less than a width of the first middle layer.

Clause 15: A method of forming an insulation product, comprising: providing a first insulation panel comprising a first layer, a first core layer, and a second layer with the second layer being wider than the first layer in a Z-direction, the second layer comprising one or more extension portions having a first extension width that is equal to or greater than a thickness of the first core layer; providing a second insulation panel including a third layer, a second core layer, and fourth layer with the fourth layer being wider than the third layer in the Z-direction, the fourth layer comprising one or more extension portions having a second extension width that is equal to or greater than a thickness of the second core layer; stacking the first and second insulation panels; aligning the first and second insulation panels; directing the second and fourth layers to fold alongside surfaces of the first and second insulation panels such that the fourth layer at least partially overlaps the second layer; directing the second layer to fold over a portion of a top surface of first insulation panel; applying heat, pressure, an adhesive, or combination thereof, to the second and fourth layers to form the insulation product by at least partially bonding the second and fourth layers.

Clause 16: A machine, comprising: a stacking assembly configured to create a stacked product from two or more products, the stacking assembly comprising: an alignment stop configured to prevent the one or more products from being transported for a predetermined about of time; and a stacking mechanism configured to stack the one or more products for the predetermined amount of time such that at least one product may be stacked with the one or more products to create the stacked product; a sealing assembly comprising: one or more second conveyor belts and one or more third conveyor belts positioned below the one or more second conveyor belts; and one or more heaters configured to heat and seal an outer layer along at least a portion of a top of the stacked product.

Clause 17: The machine of clause 16, wherein the stacking mechanism is a tilt arm configured to tilt a portion of the one or more products for the predetermined amount of time such that at least one product may be stacked underneath the one or more products to create the stacked product.

Clause 18: The machine of clause 16, wherein the stacking mechanism is a pick-and-place mechanism configured to place at least one product over one or more products to create the stacked product.

Clause 19: The machine of clause 18, wherein the pick-and-place is a robotic arm.

20. The machine of clause 16, further comprising a first plurality of conveyor belts configured to receive the one or more insulation products from a first machine configured to create the one or more insulation products.

Clause 21: The machine of clause 20, wherein the stacking mechanism comprises the first plurality of conveyor belts.

Clause 22: The machine of clause 16, wherein the one or more heaters are configured to heat and seal at least a portion of a side of the stacked product.

Clause 23: The machine of clause 17 or 22, wherein in the tilt arm and the alignment stop are spaced apart a first distance that is adjustable to a second distance.

Clause 24: The machine of any of clauses 16-23, further comprising: a product conveyor assembly comprising: one or more first conveyor belts configured to receive and transport one or more products through the stacking assembly to the sealing assembly.

The various insulation products described herein may be recyclable or curbside recyclable in many communities.

The design and functionality described in this application is intended to be exemplary in nature and is not intended to limit the instant disclosure in any way. Those having ordinary skill in the art will appreciate that the teachings of the disclosure may be implemented in a variety of suitable forms, including those forms disclosed herein and additional forms known to those having ordinary skill in the art. This disclosure is intended to cover various modifications and equivalent arrangements included within the scope of the appended claims. Although specific terms are employed herein, they are used in a generic and descriptive sense only and not for purposes of limitation.

It must also be noted that, as used in the specification and the appended claims, the singular forms "a," "an" and "the" include plural referents unless the context clearly dictates otherwise.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

Dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical range and sub-range is explicitly recited. For example, a range of approximately 1 to 99.99 should be interpreted to include not only the explicitly recited limits of approximately 1 and approximately 99.99, but also individual amounts such as 2, 3, 4, 5.01, 5.02, 26, 67.1, 99.98, etc., and sub ranges such as 5 to 80 and 30.21 to 83.24, etc. Similarly, it should be understood that when numerical ranges are provided, such ranges are to be construed as providing literal support for claim limitations that only recite the lower value of the range as well as claim limitations that only recite the upper value of the range. For example, a disclosed numerical range of 5 to 15 provides literal support for a claim reciting "greater than 5" (with no upper bounds) and a claim reciting "less than 15" (with no lower bounds).

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An insulation product, comprising:
    a first panel comprising:
        a second layer having a second width and comprising one or more first extension portions; and
        a first core layer comprising:
            a first outer surface;
            a second outer surface;
            a first thickness extending in a first direction between the first outer surface and the second outer surface;
            a first width less than the second width; and
            a first continuous paper sheet formed into a first plurality of flexible loops extending between the first outer surface and the second outer surface; and
    a second panel comprising:
        a fourth layer having a fourth width and comprising one or more second extension portions; and
        a second core layer comprising:
            a third outer surface;
            a fourth outer surface;
            a second thickness extending in the first direction between the third outer surface and the fourth outer surface;
            a fifth width less than the fourth width; and
            a second continuous paper sheet formed into a second plurality of flexible loops extending between the third outer surface and the fourth outer surface,
            wherein the one or more second extension portions have a first extension width greater than or equal to the second thickness of the second core layer such that each of the one or more second extension portions is configured to fold over and cover a first respective outer-most end of the second core layer extending in the first direction; and wherein the one or more first extension portions have a second extension width greater than the first thickness of the first core layer such that each of the one or more first extension portions is configured to fold over and cover a second respective outer-most end of the first core layer, at least a first portion of the first respective outer-most end of the second core layer, and at least a second portion of an adjacent second extension portion of the one or more second extension portions, the second respective outer-most end of the first core layer and the second portion of the adjacent second extension portion both extending in the first direction.

2. The insulation product of claim 1, wherein the first panel further comprises:
a first layer having a third width, the third width being less than the second width,
wherein the first layer is attached to the first plurality of flexible loops.

3. The insulation product of claim 1, wherein the second panel further comprises:
a third layer having a third width, the third width being less than the fourth width, and
wherein the third layer is attached to the second plurality of flexible loops.

4. The insulation product of claim 1, wherein the first and second panels are stacked.

5. The insulation product of claim 1, wherein the insulation product has an R-value per inch of thickness of 0.5 to 5.0.

6. An insulation product, comprising:
a first panel comprising:
a second layer having a second width and comprising a first extension portion and a second extension portion; and
a first core layer comprising a first plurality of flexible loops disposed on and attached to the second layer; and
a second panel comprising:
a fourth layer having a fourth width and comprising a third extension portion and a fourth extension portion; and
a second core layer comprising a second continuous paper sheet formed into a second plurality of flexible loops disposed on and attached to the fourth layer,
wherein each of the first and second extension portions has a first extension width greater than a first thickness of the first core layer extending in a first direction,
wherein each of the third and fourth extension portions has a second extension width greater than or equal to a second thickness of the second core layer extending in the first direction,
wherein the third extension portion is configured to fold over and cover a first outer-most end of the second core layer, the first outer-most end extending in the first direction,
wherein the fourth extension portion is configured to fold over and cover a second outer-most end of the second core layer, the second outer-most end extending in the first direction,
wherein the first extension portion is configured to fold over and cover a third outer-most end of the first core layer, at least a first portion of the first outer-most end of the second core layer, and at least a second portion of the third extension portion, the third outer-most end of the first core layer and the second portion of the third extension portion both extending in the first direction, and
wherein the second extension portion is configured to fold over and cover a fourth outer-most end of the first core layer, at least a third portion of the second outer-most end of the second core layer, and at least a fourth portion of the fourth extension portion, the fourth outer-most end of the first core layer and the fourth portion of the fourth extension portion both extending in the first direction.

7. The insulation product of claim 6, wherein the first panel further comprises:
a first layer having a third width, the third width being less than the second width,
wherein the first layer is attached to the first plurality of flexible loops.

8. The insulation product of claim 6, wherein the second panel further comprises:
a third layer having a third width, the third width being less than the fourth width, and
wherein the third layer is attached to the second plurality of flexible loops.

9. The insulation product of claim 6, wherein the first and second panels are stacked.

10. The insulation product of claim 6, wherein the insulation product has an R-value per inch of thickness of 0.5 to 5.0.

11. An insulation product, comprising:
a first panel comprising:
a first layer comprising two first extension portions;
a second layer; and
a first core layer comprising a first continuous paper sheet formed into a first plurality of flexible loops disposed on and attached to the second layer; and
a second panel comprising:
a third layer comprising two second extension portions;
a fourth layer; and
a second core layer comprising a second continuous paper sheet formed into a second plurality of flexible loops disposed on and attached to the third layer,
wherein the two first extension portions each have a first extension width greater than a first thickness of the first core layer extending in a first direction,
wherein the two second extension portions each have a second extension width greater than or equal to a second thickness of the second core layer extending in the first direction,
wherein each of the two second extension portions covers a first respective outer-most end of the second core layer extending in the first direction, and
wherein each of the two first extension portions covers a second respective outer-most end of the first core layer, at least a first portion of the first respective outer-most end of the second core layer, and at least a second portion of an adjacent second extension portion of the two second extension portions, the second respective outer-most end of the first core layer and the second portion of the adjacent second extension portion both extending in the first direction.

12. The insulation product of claim 11, wherein the first and second panels are stacked.

13. The insulation product of claim 12, wherein the insulation product has an R-value per inch of thickness of 0.5 to 5.0.

14. The insulation product of claim 6, further comprising:
a third panel comprising:
   a fifth layer having a fifth width and comprising a fifth extension portion and a sixth extension portion; and
   a third core layer comprising a third continuous paper sheet formed into a third plurality of flexible loops,
      wherein each of the fifth and sixth extension portions has a third extension width greater than or equal to a third thickness of the third core layer,
      wherein the fifth extension portion is configured to fold over and cover a fifth outer-most end of the third core layer,
      wherein the sixth extension portion is configured to fold over and cover a sixth outer-most end of the third core layer,
      wherein the third extension portion is configured to cover at least a portion of the fifth extension portion, and
      wherein the fourth extension portion is configured to cover at least a portion of the sixth extension portion.

15. The insulation product of claim 14, wherein:
the third extension width is greater than the third thickness of the third core layer,
the fifth extension portion is configured to fold over and cover at least a first portion of a bottom surface of the third core layer, and
the sixth extension portion is configured to fold over and cover at least a second portion of the bottom surface of the third core layer.

16. The insulation product of claim 1, wherein:
the first extension width is greater than the second thickness of the second core layer, and
each of the one or more second extension portions is configured to cover a respective portion of a first outer-most external surface of the second core layer.

17. The insulation product of claim 16, wherein the first outer-most external surface of the second core layer comprises a second outer-most external surface of the insulation product.

* * * * *